US012293700B2

(12) United States Patent
Ma et al.

(10) Patent No.: US 12,293,700 B2
(45) Date of Patent: May 6, 2025

(54) DISPLAY PANEL AND DISPLAY APPARATUS

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Hongwei Ma, Beijing (CN); Fan He, Beijing (CN); Xiangdan Dong, Beijing (CN); Ming Hu, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/245,296

(22) PCT Filed: Apr. 20, 2022

(86) PCT No.: PCT/CN2022/087809
§ 371 (c)(1),
(2) Date: Mar. 14, 2023

(87) PCT Pub. No.: WO2023/201554
PCT Pub. Date: Oct. 26, 2023

(65) Prior Publication Data

US 2024/0296784 A1 Sep. 5, 2024

(51) Int. Cl.
*G09G 3/32* (2016.01)

(52) U.S. Cl.
CPC ....... *G09G 3/32* (2013.01); *G09G 2310/0275* (2013.01)

(58) Field of Classification Search
CPC ......................... G09G 2310/0275; G09G 3/32
See application file for complete search history.

(56) References Cited

U.S. PATENT DOCUMENTS

2016/0197127 A1 7/2016 Park et al.
2019/0278145 A1* 9/2019 Tanaka .............. G02F 1/136286
(Continued)

FOREIGN PATENT DOCUMENTS

CN 105652498 A 6/2016
CN 109541865 A 3/2019
(Continued)

*Primary Examiner* — Hang Lin
(74) *Attorney, Agent, or Firm* — XSENSUS LLP

(57) ABSTRACT

A display panel includes a plurality of pixel driving circuits and a plurality of first data lines that are all disposed in a display area, a plurality of pads disposed in a non-display area, and at least one data lead. The pixel driving circuits constitute a plurality of circuit columns arranged in a first direction. A circuit column includes at least two pixel driving circuits arranged in a second direction. A first data line is coupled to the at least two pixel driving circuits in the circuit column. A data lead in the at least one data lead is coupled to the first data line and at least one pad in the plurality of pads. The circuit columns constitute a plurality of circuit groups arranged in the first direction, and a circuit group includes at least one circuit column. The data lead is disposed between two adjacent circuit groups.

16 Claims, 13 Drawing Sheets

(56) References Cited

U.S. PATENT DOCUMENTS

| | | | | |
|---|---|---|---|---|
| 2019/0279563 | A1 * | 9/2019 | Hwang | G09G 3/3225 |
| 2020/0312252 | A1 | 10/2020 | Jeong et al. | |
| 2021/0223654 | A1 * | 7/2021 | Li | G02F 1/1345 |
| 2022/0005913 | A1 * | 1/2022 | Xiao | G09G 3/006 |

FOREIGN PATENT DOCUMENTS

| | | | |
|---|---|---|---|
| CN | 109791745 | A | 5/2019 |
| CN | 111755476 | A | 10/2020 |
| CN | 112185267 | A | 1/2021 |
| CN | 113870713 | A | 12/2021 |

* cited by examiner

DISPLAY PANEL AND DISPLAY APPARATUS

CROSS-REFERENCE TO RELATED APPLICATION

This application is a national phase entry under 35 USC 371 of International Patent Application No. PCT/CN 2022/087809 filed on Apr. 20, 2022, which is incorporated herein by reference in its entirety.

TECHNICAL FIELD

The present disclosure relates to the field of display technologies, and in particular, to a display panel and a display apparatus.

BACKGROUND

In order to bring better use experience to users, full-screen, narrow bezel, and high resolution become development trends of future display products, especially mobile phone products.

SUMMARY

In an aspect, a display panel is provided. The display panel has a display area and a non-display area located on at least one side of the display area, and includes a plurality of pixel driving circuits, a plurality of pads, a plurality of first data lines and at least one data lead. The plurality of pixel driving circuits are disposed in the display area, and constitute a plurality of circuit columns arranged in a first direction. A circuit column includes at least two pixel driving circuits arranged in a second direction. The second direction and the first direction intersect. The plurality of pads are disposed in the non-display area, and are located on a side of the display area in the second direction. The plurality of first data lines are disposed in the display area. A first data line extends in the second direction, and is coupled to the at least two pixel driving circuits in the circuit column. A data lead in the at least one data lead is coupled to the first data line, and extends from the display area to the non-display area. The data lead is coupled to at least one pad in the plurality of pads. The plurality of circuit columns constitute a plurality of circuit groups arranged in the first direction, and a circuit group includes at least one circuit column. The data lead is disposed between two adjacent circuit groups.

In some embodiments, the at least one data lead includes at least one first data lead, and a portion of a first data lead in the at least one first data lead located in the display area is arranged in a same layer as the first data line.

In some embodiments, the at least one data lead includes at least one second data lead, and a portion of a second data lead in the at least one second data lead located in the display area is arranged in a different layer from the first data line.

In some embodiments, the at least one data lead further includes at least one first data lead. A portion of a first data lead in the at least one first data lead located in the display area is arranged in a same layer as the first data line. The first data lead is non-overlapped with the second data lead in a thickness direction of the display panel.

In some embodiments, the display panel further includes a plurality of first signal lines disposed in the display area. A first signal line extends in the first direction, and includes a plurality of first line segments and at least one second line segment. The portion of the second data lead located in the display area is arranged in a same layer as the first line segments, and is disposed between two adjacent first line segments. Two adjacent first line segments in the first direction are coupled through a second line segment in the at least one second line segment, and the second line segment is arranged in a different layer from the first line segments.

In some embodiments, the display panel further includes at least one connection line disposed in the display area and extending in the first direction. The first data line is coupled to the data lead through a connection line in the at least one connection line, and the connection line is arranged in the same layer as the portion of the second data lead located in the display area.

In some embodiments, the display panel further includes at least one connection line disposed in the display area and extending in the first direction. The first data line is coupled to the data lead through a connection line in the at least one connection line.

In some embodiments, the display panel further includes a plurality of signal lines disposed in the display area and extending in the first direction. The plurality of signal lines constitute a plurality of signal line groups arranged in the second direction, and a signal line group includes at least one signal line. The connection line is arranged in a same layer as at least a portion of a signal line, and is disposed between two adjacent signal line groups.

In some embodiments, a distance between every two adjacent signal line groups in the plurality of signal line groups is substantially same.

In some embodiments, the display panel further includes a plurality of light-emitting devices respectively coupled to the pixel driving circuits. The plurality of first data lines include a plurality of heterochromatic data lines, and a heterochromatic data line is coupled to at least two light-emitting devices with different light-emitting colors. A portion, located in the display area, of each of data leads respectively coupled to the plurality of heterochromatic data lines is arranged in a same layer.

In some embodiments, the display panel further includes at least one second data line adjacent to a central line of the display panel. A second data line in the at least one second data line extends from the display area to the non-display area in the second direction, and is coupled to at least one pad in the plurality of pads.

In some embodiments, the at least one data lead includes a plurality of data leads constituting a plurality of lead groups arranged in the first direction. Each data lead in a lead group is disposed between two adjacent circuit groups. In the display area, a distance between every two adjacent lead groups in the plurality of lead groups is substantially same.

In another aspect, a display apparatus is provided. The display apparatus includes the display panel in any one of the above embodiments.

In yet another aspect, a manufacturing method of a display panel is provided. The manufacturing method of the display panel includes: forming a plurality of pixel driving circuits, a plurality of pads, a plurality of first data lines and at least one data lead on a substrate. The plurality of pixel driving circuits constitute a plurality of circuit columns arranged in a first direction, and a circuit column includes at least two pixel driving circuits arranged in a second direction. The first direction and the second direction intersect. The plurality of pads are located on a side of the plurality of pixel driving circuits in the second direction. A first data line extends in the second direction, and is coupled to the at least two pixel driving circuits in the circuit column. A data lead in the at least one data lead extends in the second direction, and is coupled to the first data line and at least one pad in the plurality of pads. The plurality of circuit columns constitute a plurality of circuit groups arranged in the first direction, and a circuit group includes at least one circuit column. The data lead is disposed between two adjacent circuit groups.

In some embodiments, in the first direction, a portion of the data lead located in the display area is closer to a central line of the display panel than the first data line.

In some embodiments, the at least one data lead includes a plurality of data leads each having a first portion located in the display area. The first portion has a length in the second direction, and lengths of first portions of the plurality of data leads are increased and then decreased in the first direction.

In some embodiments, a number of the at least one circuit column in each circuit group is same.

In some embodiments, the at least one circuit column includes one, two or four circuit columns.

In some embodiments, the heterochromatic data line is further coupled to the at least two pixel driving circuits in the circuit column.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on an actual size of a product, an actual process of a method, and an actual timing of a signal involved in the embodiments of the present disclosure.

DETAILED DESCRIPTION

Figure 1:
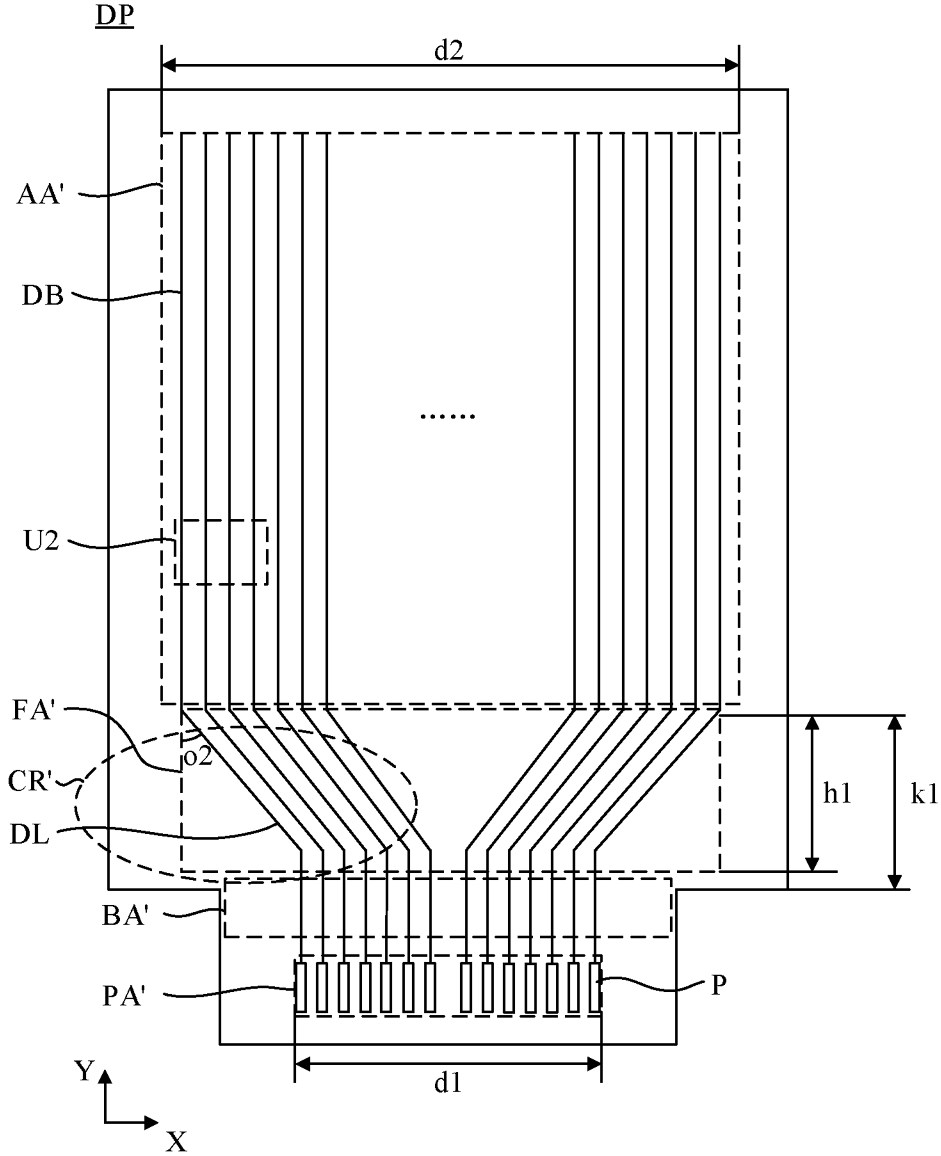
FIG. 1 is a structural diagram of a display panel in the related art.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to." In the description of the specification, the terms such as "one embodiment," "some embodiments," "exemplary embodiments," "an example," "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are only used for descriptive purposes, and are not to be construed as indicating or implying relative importance or implicitly indicating the number of indicated technical features. Thus, a feature defined with "first" or "second" may explicitly or implicitly include one or more of the features. In the description of the embodiments of the present disclosure, the term "a plurality of/the plurality of" means two or more unless otherwise specified.

In the description of some embodiments, the term "coupled" and "connected" and derivatives thereof may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

The phrase "at least one of A, B and C" has the same meaning as the phrase "at least one of A, B or C", both including following combinations of A, B and C: only A, only B, only C, a combination of A and B, a combination of A and C, a combination of B and C, and a combination of A, B and C.

The use of the phase "configured to" herein means an open and inclusive expression, which does not exclude devices that are applicable to or configured to perform additional tasks or steps.

In addition, the use of the phase "based on" means openness and inclusiveness, since a process, step, calculation or other action that is "based on" one or more stated conditions or values may, in practice, be based on additional conditions or values exceeding those stated.

As used herein, the term "substantially" or "approximately" includes a stated value and an average value within an acceptable range of deviation of a particular value. The acceptable range of deviation is determined by a person of ordinary skill in the art, considering measurement in question and errors associated with measurement of a particular quantity (i.e., limitations of a measurement system).

As used herein, the term such as "parallel," "perpendicular" or "equal" includes a stated condition and condition(s) similar to the stated condition. The similar condition(s) are within an acceptable range of deviation as determined by a person of ordinary skill in the art, considering measurement in question and errors associated with measurement of a particular quantity (i.e., limitations of a measurement system). For example, the term "parallel" includes "absolutely parallel" and "approximately parallel", and for the phrase "approximately parallel", an acceptable range of deviation may be, for example, within 5°. The term "perpendicular" includes "absolutely perpendicular" and "approximately perpendicular", and for the phrase "approximately perpendicular", an acceptable range of deviation may also be, for example, within 5°. The term "equal" includes "absolutely equal" and "approximately equal", and for the phrase "approximately equal", an acceptable range of deviation may be that, for example, a difference between two that are equal to each other is less than or equal to 5% of any one of the two.

It will be understood that when a layer or element is described as being on another layer or substrate, the layer or element may be directly on the another layer or substrate, or intermediate layer(s) may exist between the layer or element and the another layer or substrate.

Exemplary embodiments are described herein with reference to sectional views and/or plan views as idealized exemplary drawings. In the accompanying drawings, thicknesses of layers and sizes of regions are enlarged for clarity. Thus, variations in shape relative to the accompanying drawings due to, for example, manufacturing techniques and/or tolerances may be envisaged. Therefore, the exemplary embodiments should not be construed to be limited to the shapes of regions shown herein, but to include deviations in shape due to, for example, manufacturing. For example, an etched region shown in a rectangular shape generally has a curved feature. Therefore, the regions shown in the accompanying drawings are schematic in nature, and their shapes are not intended to show actual shapes of the regions in a device, and are not intended to limit the scope of the exemplary embodiments.

Referring to FIG. 1, in the related art, a display panel DP may have a display area AA'. The display panel DP may further have a fan-out area FA', a folding area BA' and a bonding area PA' that are all located on a side of the display area AA' (e.g., located on a side of the display area AA' in the negative Y-axis direction). For example, the fan-out area FA', the folding area BA' and the bonding area PA' may be arranged in sequence.

The display panel DP may further include a plurality of data lines DB, a plurality of data leads DL and a plurality of pads P. Data lines DB (e.g., all of the data lines DB) are located in the display area AA'. A data line DB (e.g., each data line DB) may be configured to write data signals to respective pixel driving circuits. The plurality of pads P may be disposed in the bonding area PA'. A data line DB located in the display area AA' may be coupled to at least one pad P located in the bonding area PA' through a data lead. A data lead DL (e.g., each data lead DL) is coupled to a data line DB, and may further extend from the fan-out area FA' to the folding area BA' and the bonding area PA', so as to be coupled to the at least one pad P (e.g., one or more pads) in the bonding area PA'. Furthermore, a pad P (e.g., each pad P) may be configured to be coupled to a data driving circuit (e.g., a source driver). In this way, electrical signals (e.g., including the data signals) output from the data driving circuit may be written to the respective pixel driving circuits through the one or more pads P, the data lead DL and the data line DB.

Referring to FIG. 1 again, a portion of the display panel DP located in the folding area BA' may be folded, so as to fold a portion of the display panel DP located in the bonding area PA' to a back of the display panel DP, i.e., to a side of the display panel DP where a non-display surface of the display panel DP is located. Based on the above, a height h1 of the fan-out area FA' (e.g., a dimension of the fan-out area FA' in the Y-axis direction) may affect a size k1 of a bezel (e.g., a lower bezel at an end of the display panel DP in the negative direction of the Y-axis) of the display panel DP. The larger the height h1 of the fan-out area FA', the larger the size k1 of the lower bezel of the display panel DP.

For the height of the fan-out area FA', since a dimension d1, in a first direction (e.g., parallel to the X-axis direction), of the bonding area PA' in which the plurality of pads P are disposed is less than a dimension d2, in the first direction, of the display area AA' in which the plurality of data lines DB are disposed, the plurality of data leads DL in the fan-out area FA' may be arranged in a fan shape, so that in the fan-out area FA', there are many inclined wirings (e.g., portions of the data leads DL extending in a direction non-parallel to the Y axis), especially at a corner CR' of the lower bezel of the display panel DP, which results in a large height h1 of the fan-out area FA', thereby resulting in a large bezel size of the display panel DP.

The bezel size of the display panel DP may be reduced by reducing the number of the data lines DB. Since the number of the data lines DB is reduced, the number of the inclined wirings in the fan-out area FA' may be reduced, so that the bezel size of the display panel DP is reduced. However, the number of the data lines DB is reduced, which may result in a reduction in the number of light-emitting devices in the display panel DP, i.e., a reduction in the resolution of the display panel DP. How to reduce the bezel size of the display panel while ensuring the resolution of the display panel is an urgent problem to be solved at present.

To solve the above problem, embodiments of the present disclosure provide a display panel and a manufacturing method thereof, and a display apparatus.

Figure 2:
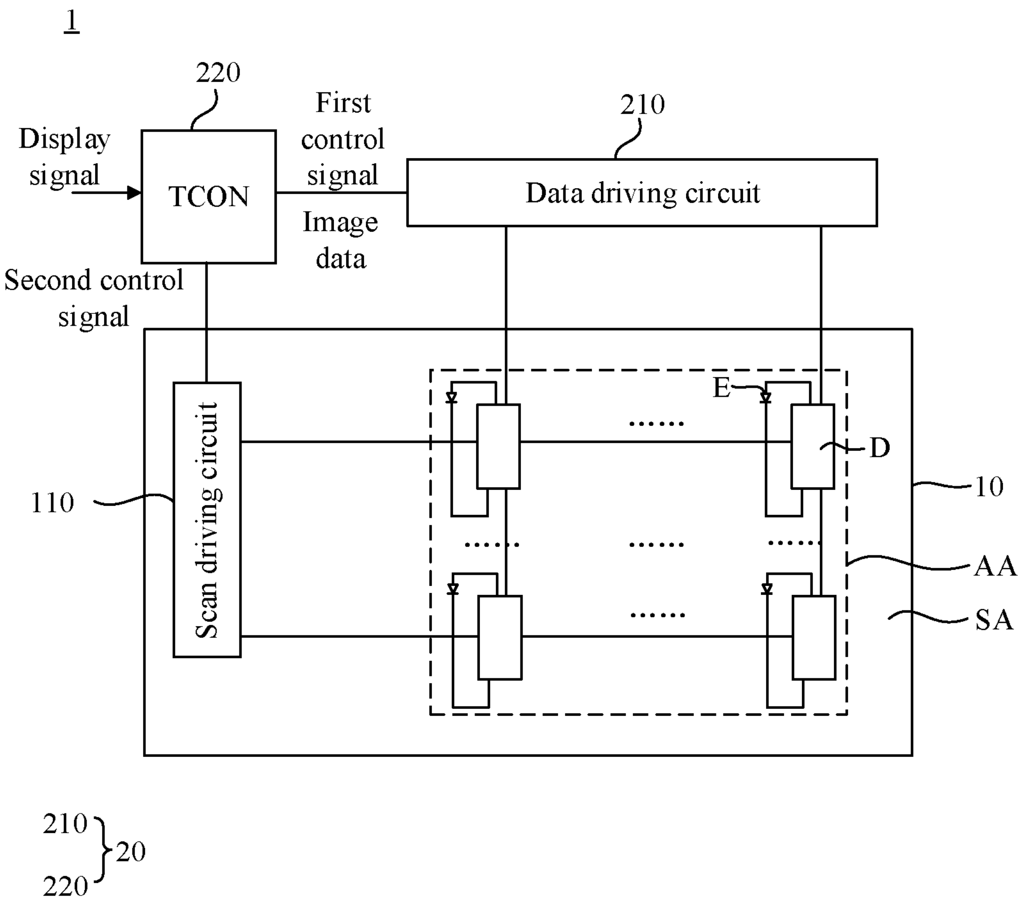
FIG. 2 is a structural diagram of a display apparatus, in accordance with some embodiments.

FIG. 2 is a structural diagram of a display apparatus, in accordance with some embodiments. Referring to FIG. 2, the display apparatus 1 is a product with an image (including a still image or a moving image, and the moving image may be a video) display function. For example, the display apparatus 1 may be any one of a display, a television, a billboard, a digital photo frame, a laser printer with a display function, a telephone, a mobile phone, a personal digital assistant (PDA), a digital camera, a camcorder, a viewfinder, a navigator, a vehicle, a large area wall screen, a home appliance, an information inquiry apparatus (e.g., a business inquiry apparatus of an e-government, a bank, a hospital or an electric power department), and a monitor.

The display apparatus 1 includes a display panel 10. The display panel 10 may be configured to display image(s). A structure of the display panel will be described in detail below. The display apparatus 1 may further include a driving control circuit 20 coupled to the display panel 10. The driving control circuit 20 is configured to provide electrical signals to the display panel 10, and the display panel 10 may display image(s) in response to the electrical signals.

Referring to FIG. 2 again, the driving control circuit 20 may include a data driving circuit 210 (also referred to as source driver IC). The data driving circuit 210 is configured to provide data driving signals (also referred to as data signals) to the display panel 10.

The driving control circuit 20 may further include a timing control circuit 220 (also referred to as timing controller, TCON) coupled to the data driving circuit 210.

In some embodiments, the driving control circuit 20 may further include a scan driving circuit 110. In some other embodiments, a scan driving circuit 110 may be integrated in the display panel 10. That is, the display panel 10 includes the scan driving circuit 110. Since the scan driving circuit 110 is disposed in the display panel 10, the scan driving circuit 110 may also be referred to as a gate driver on array (GOA, i.e., a scan driving circuit disposed on an array substrate).

The timing control circuit 220 may be coupled to the data driving circuit 210, and may further be coupled to the scan driving circuit 110.

The timing control circuit 220 may be configured to receive a display signal, and the display signal is, for example, a power supply signal, a video image signal, a communication signal (e.g., a signal corresponding to an IIC communication protocol), or a mode control signal (e.g., a mode control signal corresponding to a test mode or a mode control signal corresponding to a normal display mode). The video image signal is, for example, a mobile industry processor interface (MIPI) signal, or a low-voltage differential signaling (LVDS) signal. The video image signal may include image data and timing control signals. The image data includes, for example, pixel data of a plurality of sub-pixels, and the pixel data may be RGB data. The timing control signals include, for example, a data enable (DE) signal, a horizontal synchronization (also referred to as Hsync, HS) signal, and a vertical synchronization (also referred to as Vsync, VS) signal.

The timing control circuit 220 may be further configured to, in response to the display signal, output a first control signal and image data to the data driving circuit 210, and output a second control signal to the scan driving circuit 110. The first control signal is configured to control an operation timing of the data driving circuit 210, and the second control signal is configured to control an operation timing of the scan driving circuit 110.

The data driving circuit 210 may be configured to convert the received image data into data signals of a plurality of light-emitting devices E (to be described below) in the display panel 10, and to output the respective data signals to a plurality of pixel driving circuits D (to be described below) coupled to the respective light-emitting devices E according to the operation timing determined by the first control signal. The scan driving circuit 110 is configured to output respective scan signals to the plurality of pixel driving circuits D according to the operation timing determined by the second control signal.

Some embodiments of the present disclosure further provide a display panel that may be used as the display panel in the display apparatus in any one of the above embodiments. Of course, the display panel may also be applied to other display apparatuses, which is not limited in the embodiments of the disclosure.

Figure 3:
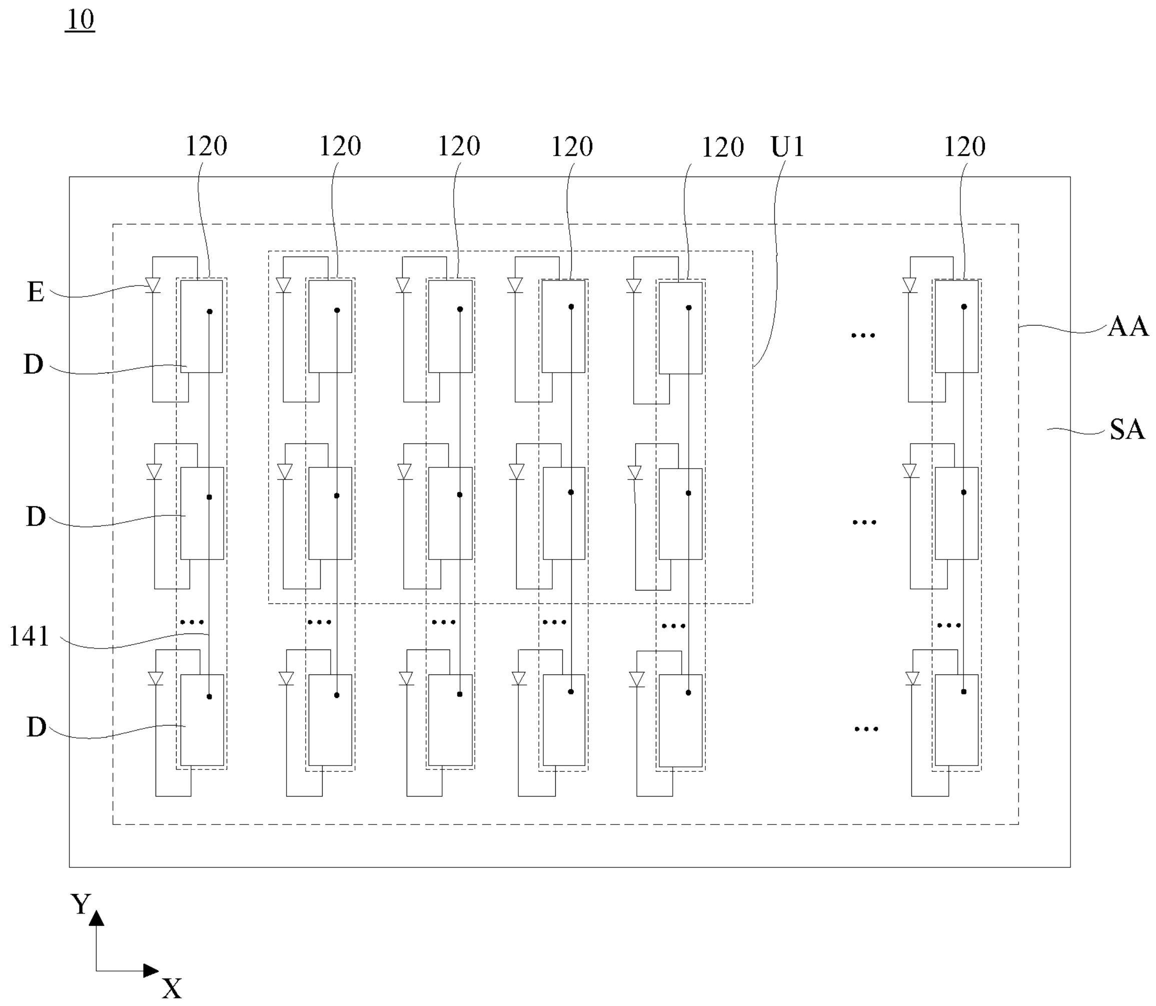
FIGS. 3 and 4 are structural diagrams of a display panel, in accordance with some embodiments.
Figure 4:
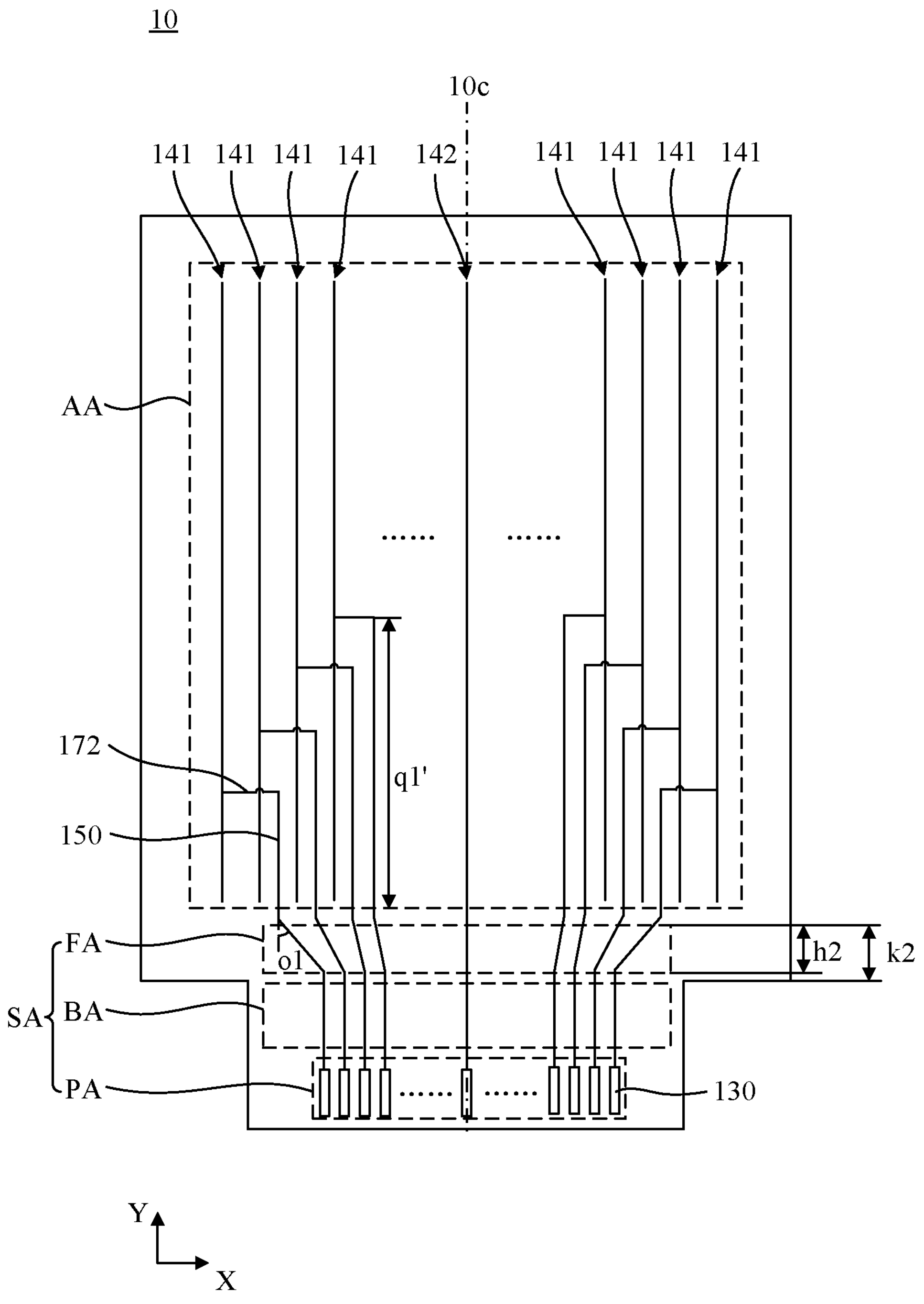

FIGS. 3 and 4 are structural diagrams of a display panel, in accordance with some embodiments. It will be noted that for clarity of the drawings, FIG. 3 illustrates a plurality of pixel driving circuits, a plurality of light-emitting devices and a plurality of data lines in the display panel, and a plurality of data leads are omitted. Moreover, a specific structure of a non-display area is omitted in FIG. 3. FIG. 4 illustrates the plurality of data lines and the plurality of data leads in the display panel, and the plurality of pixel driving circuits and the plurality of light-emitting devices are omitted.

Referring to FIGS. 3 and 4, the display panel 10 may be one of an organic light-emitting diode (OLED) display panel, a quantum dot light-emitting diode (QLED) display panel, a mini light-emitting diode (Mini LED) display panel, or micro light-emitting diode (Micro LED) display panel.

Referring to FIGS. 3 and 4 again, the display panel 10 has a display area AA. A portion of the display panel 10 located in the display area AA may display image(s). The display panel 10 further has the non-display area SA. The non-display area SA may be located on at least one side (for example, a side; for another example, a periphery, i.e., upper and lower sides and left and right sides) of the display area AA. Referring to FIG. 4, in some embodiments, the non-display area SA of the display panel 10 may include a bonding area PA. The non-display area SA of the display panel 10 may further include a fan-out area FA and a folding area BA. The fan-out area FA, the folding area BA and the bonding area PA may be located on a side of the display area AA (e.g., located on a side of the display area AA in the negative Y-axis direction). Moreover, the fan-out area FA, the folding area BA and the bonding area PA may be arranged in sequence. For example, the fan-out area FA, the folding area BA and the bonding area PA may be arranged in sequence in the negative Y-axis direction.

Referring to FIG. 3, the display panel 10 may include the plurality of light-emitting devices E. Light-emitting devices E (e.g., all of the light-emitting devices E) may be disposed in the display area AA. The light-emitting device E may emit light. For example, the light-emitting device E can emit one of red light, green light, blue light, or white light. The plurality of light-emitting devices E disposed in the display area AA can emit light, so that the portion of the display panel 10 located in the display area AA may display image (s). The light-emitting device E may be one of an organic light-emitting diode (OLED), a quantum dot light-emitting diode (QLED), and a light-emitting diode (LED).

Referring to FIG. 3 again, the display panel 10 may further include the plurality of pixel driving circuits D. Pixel driving circuits D (e.g., all of the pixel driving circuits D) are disposed in the display area AA. A pixel driving circuit D (e.g., each pixel driving circuit D) may be coupled to a light-emitting device E. The pixel driving circuit D may be configured to, in response to received scan and data signals (e.g., the scan signal output from the scan driving circuit and the data signal output from the data driving circuit), provide an electrical signal (e.g., a driving voltage or a driving current) to the light-emitting device E coupled to this pixel driving circuit D to drive this light-emitting device E to emit light, so that the display panel 10 may display image(s).

The pixel driving circuit D may include a plurality of transistors and at least one capacitor (e.g., one or more capacitors). For example, the pixel driving circuit may have a "2T1C" structure, a "6T1C" structure, a "7T1C" structure, a "6T2C" structure, or a "7T2C" structure. Here, "T" represents a transistor, e.g., a thin film transistor, and a number before "T" represents the number of transistors. "C" represents a capacitor, and a number before "C" represents the number of capacitor(s). The pixel driving circuit D will be described below in an example where the pixel driving circuit D has the "7T1C" structure. It will be understood that in a case where the pixel driving circuit D has other structure, structures, functions and connection relationships of elements (such as transistors and capacitor(s)) in the pixel driving circuit D may be similar to those of the pixel driving circuit D having the "7T1C" structure, and may refer to the following related description.

In some embodiments, all of the transistors in the pixel driving circuit D are low temperature poly-silicon (LTPS) transistors. A material of an active layer in the LTPS transistor may include poly-silicon. In some other embodiments, one or more (e.g., two) transistors in the pixel driving circuit D are oxide transistors, and a material of an active layer in the oxide transistor may include an oxide, such as indium gallium zinc oxide (IGZO). In a case where the pixel driving circuit D includes at least one LTPS transistor and at least one oxide transistor, the pixel driving circuit D may also be referred to as a low temperature polycrystalline oxide (LTPO) pixel driving circuit.

Figure 5:
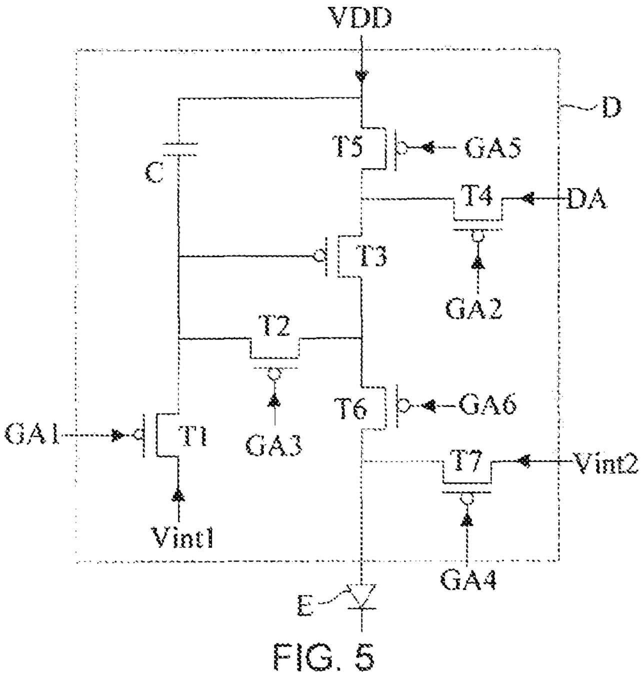
FIG. 5 is an equivalent circuit diagram of a pixel driving circuit.
Figure 6:
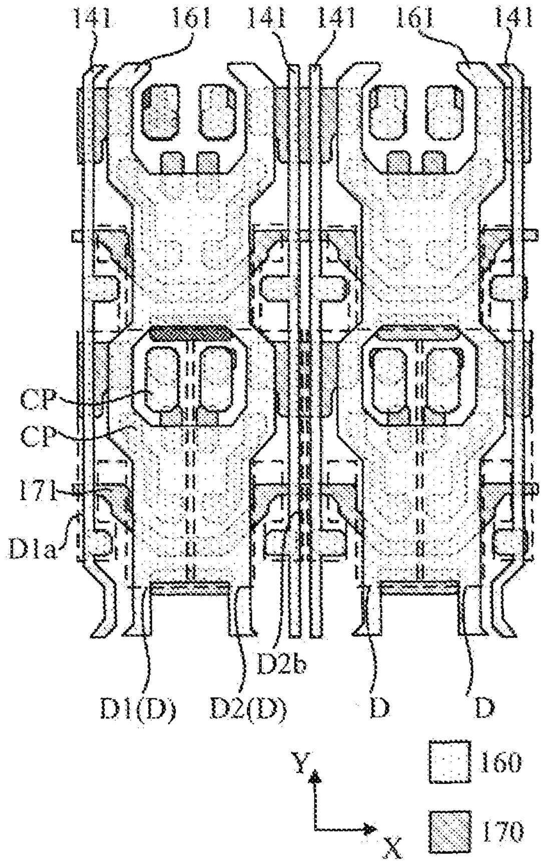
FIG. 6 is a top view of a plurality of pixel driving circuits in a display panel, in accordance with some embodiments.

FIG. 5 is an equivalent circuit diagram of a pixel driving circuit. FIG. 6 is a top view of a plurality of pixel driving circuits in a display panel, in accordance with some embodiments. It will be noted that FIG. 6 only illustrates a plurality of conductor pattern layers, and other film layers are omitted. For example, an active layer is omitted.

Referring to FIG. 5, the pixel driving circuit may have the 7T1C structure. That is, the pixel driving circuit D may include seven transistors, such as a first transistor T1, a second transistor T2, a third transistor T3, a fourth transistor T4, a fifth transistor T5, a sixth transistor T6 and a seventh transistor T7. The pixel driving circuit D may further include a capacitor C.

For example, an operating process of the pixel driving circuit D may include following three phases.

In a first phase, the first transistor T1 is turned on in response to a first scan signal GA1 to write a first reset signal Vint1 to a gate of the third transistor T3. In this way, the gate of the third transistor T3 may be reset. In addition, in the first phase, the second transistor T2, the fourth transistor T4, the fifth transistor T5 and the sixth transistor T6 may be turned off.

In a second phase, the fourth transistor T4 is turned on in response to a second scan signal GA2. Moreover, the second transistor T2 is turned on in response to a third scan signal GA3. A data signal DA may be written to the gate of the third transistor T3 through the fourth transistor T4 and the second transistor T2, so that a gate voltage of the third transistor T3 may be a sum of $V_{DA}$ and $V_{th}$ (i.e., $V_{DA}+V_{th}$). Here, $V_{DA}$ is a voltage of the data signal DA, and $V_{th}$ is a threshold voltage of the third transistor T3. In addition, in the second phase, the first transistor T1, the fifth transistor T5 and the sixth transistor T6 may be turned off.

In some embodiments, in the second phase, the seventh transistor T7 may be turned on in response to a fourth scan signal GA4 to write a second reset signal Vint2 to the light-emitting device E. In this way, the light-emitting device E may be reset. In some possible implementations, a gate of the fourth transistor T4 and a gate of the seventh transistor T7 may be connected in series, so that the fourth transistor T4 and the seventh transistor T7 may be turned on in the second phase. Thus, in the second phase, the data signal DA may be written to the gate of the third transistor T3, and the light-emitting device E may be reset. In some other embodiments, the above step of writing the second reset signal Vint2 to the light-emitting device E may be performed in the first phase. For example, a gate of the first transistor T1 and the gate of the seventh transistor T7 may be connected in series, so that the first transistor T1 and the seventh transistor T7 may be turned on in the first phase. Thus, the third transistor T3 and the light-emitting device E may be reset in the first phase.

In a third phase, the fifth transistor T5 is turned on in response to a fifth scan signal GA5. A power supply voltage signal VDD may be written to a first electrode (e.g., source) of the third transistor T3 through the fifth transistor T5, so that a voltage on the first electrode of the third transistor T3 is $V_{VDD}$ that is a voltage of the power supply voltage signal VDD. The third transistor T3 may generate a driving current flowing through the first electrode and a second electrode (e.g., drain) of the third transistor T3 in response to the voltage $V_{VDD}$ on the first electrode and the gate voltage ($V_{DA}+V_{th}$) of the third transistor T3. Moreover, the sixth transistor T6 is turned on in response to a sixth scan signal GA6. The driving current generated by the third transistor T3 may flow into the light-emitting device E through the sixth transistor T6, so as to drive the light-emitting device E to emit light. In addition, in the third phase, the first transistor T1, the second transistor T2, the fourth transistor T4 and the seventh transistor T7 may be turned off.

Referring to FIGS. 5 and 6, the display panel may include the active layer (not shown in the drawings), and the plurality of conductor pattern layers such as a first conductor pattern layer 160 and a second conductor pattern layer 170. The active layer and the plurality of conductor pattern layers may constitute one or more pixel driving circuits D described above.

In addition, referring to FIGS. 5 and 6 again, in order to write the above electrical signals to the pixel driving circuit D, the conductor pattern layer may further include one or more signal lines. A signal line may be configured to write one or more of the above electrical signals (e.g., the data signal DA, the first scan signal GA1, the second scan signal GA2, the third scan signal GA3, the fourth scan signal GA4, the fifth scan signal GA5, the sixth scan signal GA6, the first reset signal Vint1, the second reset signal Vint2, and the power supply voltage signal VDD) to the pixel driving circuit D. It will be understood by those skilled in the art that in a case where a signal line writes a plurality of electrical signals to the pixel driving circuit D, the plurality of electrical signals may be the same.

Referring to FIGS. 5 and 6 again, for example, the first conductor pattern layer 160 may include a plurality of first data lines 141. The first data line 141 may be coupled to fourth transistors T4 in pixel driving circuits D. The first data line 141 may be configured to write respective data signals DA to the pixel driving circuits D. The first conductor pattern layer 160 may further include a plurality of power supply voltage signal lines 161. The first power supply voltage signal line 161 may be coupled to fifth transistors T5 in pixel driving circuits D. The first power supply voltage signal line 161 may be configured to write respective power supply voltage signals VDD to the pixel driving circuits D. In addition, the first conductor pattern layer 160 may further include one or more connection patterns CP. The connection pattern CP may be a portion of the pixel driving circuit D. The connection pattern CP may be configured to couple two elements in the pixel driving circuit D (the element in the pixel driving circuit D is, for example, a transistor or a capacitor). The connection pattern CP may further be configured to couple the pixel driving circuit D to other element than the pixel driving circuit D, e.g., to couple the pixel driving circuit D to the light-emitting device E.

For another example, referring to FIGS. 5 and 6 again, the second conductor pattern layer 170 may include a plurality of reset signal lines. The reset signal line 171 may be coupled to seventh transistors T7 in pixel driving circuits D. The reset signal line 171 may be configured to write respective second reset signals Vint2 to the pixel driving circuits D.

In addition, similar to the first conductor pattern layer 160, the second conductor pattern layer 170 may also include one or more connection patterns CP.

Based on the above, a pixel driving circuit D may be a smallest unit capable of realizing the above functions, as shown in FIG. 6. Referring to FIG. 6, it will be understood by those skilled in the art that the pixel driving circuit D is coupled to one or more signal lines. For example, the signal line may be in contact with the pixel driving circuit, so that the signal line and the pixel driving circuit are coupled to each other. Therefore, the position of the pixel driving circuit D varies, and the position of the one or more signal lines coupled to this pixel driving circuit D varies accordingly. Based on this, a portion of the signal line may be configured to define a border of the pixel driving circuit D. For example, a portion of the signal line that is in contact with the pixel driving circuit may be configured to define the border of the pixel driving circuit. For example, a portion of the first data line 141 coupled to a pixel driving circuit D1 may be used as a left border D1_a_ of the pixel driving circuit D1 (e.g., a border of the pixel driving circuit D1 in the negative X-axis direction). For another example, a portion of the first data line 141 coupled to a pixel driving circuit D2 may be used as a right border D2_b_ of the pixel driving circuit D2 (e.g., a border of the pixel driving circuit D2 in the positive X-axis direction).

Referring to FIGS. 3 and 6, the plurality of pixel driving circuits D in the display panel 10 may constitute a plurality of circuit columns 120 arranged in a first direction (e.g., parallel to the X-axis direction). A circuit column 120 (e.g., each circuit column 120) includes at least two pixel driving circuits D arranged in a second direction (e.g., parallel to the Y-axis direction). For example, the plurality of pixels driving circuit D in the display panel 10 may be arranged in an array. It will be noted that the first direction and the second direction intersect. For example, the first direction is perpendicular to the second direction. The first direction (e.g., parallel to the X-axis direction) and the second direction (e.g., parallel to the Y-axis direction) may be parallel to respective extending directions of the display panel 10.

Referring to FIG. 4, the display panel 10 includes a plurality of pads 130. The plurality of pads 130 are disposed in the non-display area SA. Moreover, pads 130 (e.g., all of the pads 130) may be located on a side of the display area AA in the second direction (e.g., parallel to the Y-axis direction). For example, the bonding area PA may be located on the side of the display area AA in the second direction, e.g., located on the side of the display area AA in the negative Y-axis direction, and the pads 130 (e.g., all of the pads 130) may be located in the bonding area PA.

A pad 130 (e.g., each pad 130) may be configured to be coupled to the data driving circuit (i.e., source driver). For example, the pad 130 may be coupled to the data driving circuit through an anisotropic conductive adhesive.

Referring to FIGS. 3 and 4, the display panel 10 includes the plurality of first data lines 141. First data lines 141 (e.g., all of the first data lines 141) are disposed in the display area AA. A first data line 141 (e.g., each first data line 141) extends in the second direction (e.g., parallel to the Y-axis direction), and is coupled to at least two pixel driving circuits D in a circuit column 120. For example, the first data line 141 may be coupled to two pixel driving circuits D in the circuit column 120. For another example, the first data line 141 may be coupled to all of the pixel driving circuits D in the circuit column 120.

Referring to FIG. 4, the display panel 10 further includes at least one data lead 150 (e.g., one or more data leads 150). A data lead 150 (e.g., each data lead 150) is coupled to a first data line 141. A data lead 150 (e.g., each data lead 150) extends from the display area AA to the non-display area SA. Moreover, this data lead 150 is coupled to at least one pad 130 (e.g., one or more pads 130). In this way, the first data line 141 may be coupled to the at least one pad 130 through the data lead 150. For example, the data lead 150 may include a first portion and a second portion that are coupled to each other. The first portion is located in the display area AA, and may be a straight line extending in the second direction. The second portion is located in the non-display area, and may be coupled to the at least one pad 130.

Referring to FIGS. 3 and 4, the pad 130 may be configured to be coupled to the data driving circuit with reference to the above description. Moreover, the data lead 150 is coupled to the at least one pad 130, the data lead 150 is further coupled to the first data line 141, and the first data line 141 is coupled to the at least two pixel driving circuits in the circuit column 120. Based on this, the at least two pixel driving circuits D (e.g., all of the pixel driving circuits D) in the circuit column 120 may be coupled to the data driving circuit through the first data line and the data lead, so that the data signals output from the data driving circuit may be written to the at least two pixel driving circuits D (e.g., all of the pixel driving circuits D) in the circuit column 120. In response to the respective data signals, light-emitting devices E respectively coupled to the at least two pixel driving circuits D may emit light, so that the display panel 10 may display image(s).

Figure 7:
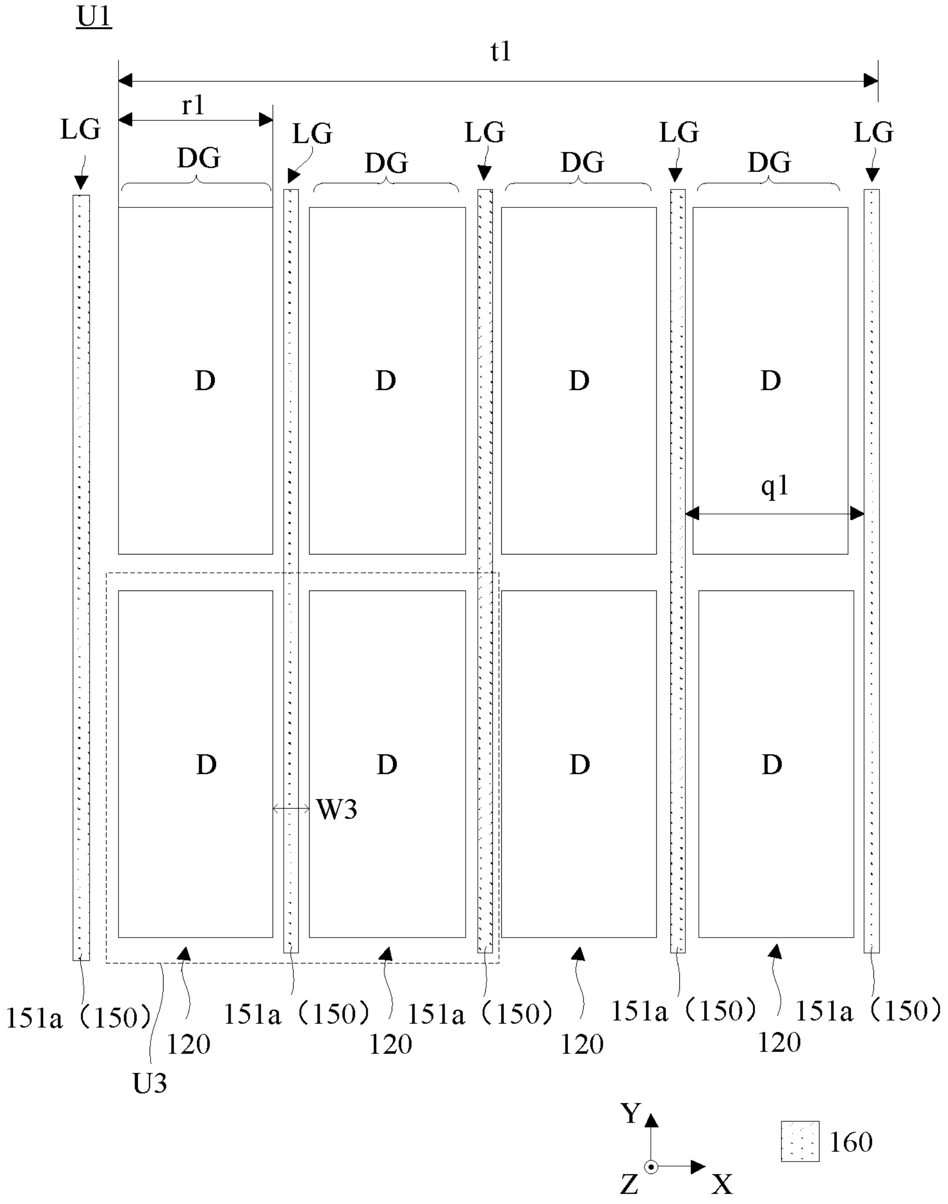
FIGS. 7 to 9 are partial enlarged views of a display panel, in accordance with some embodiments.
Figure 8:
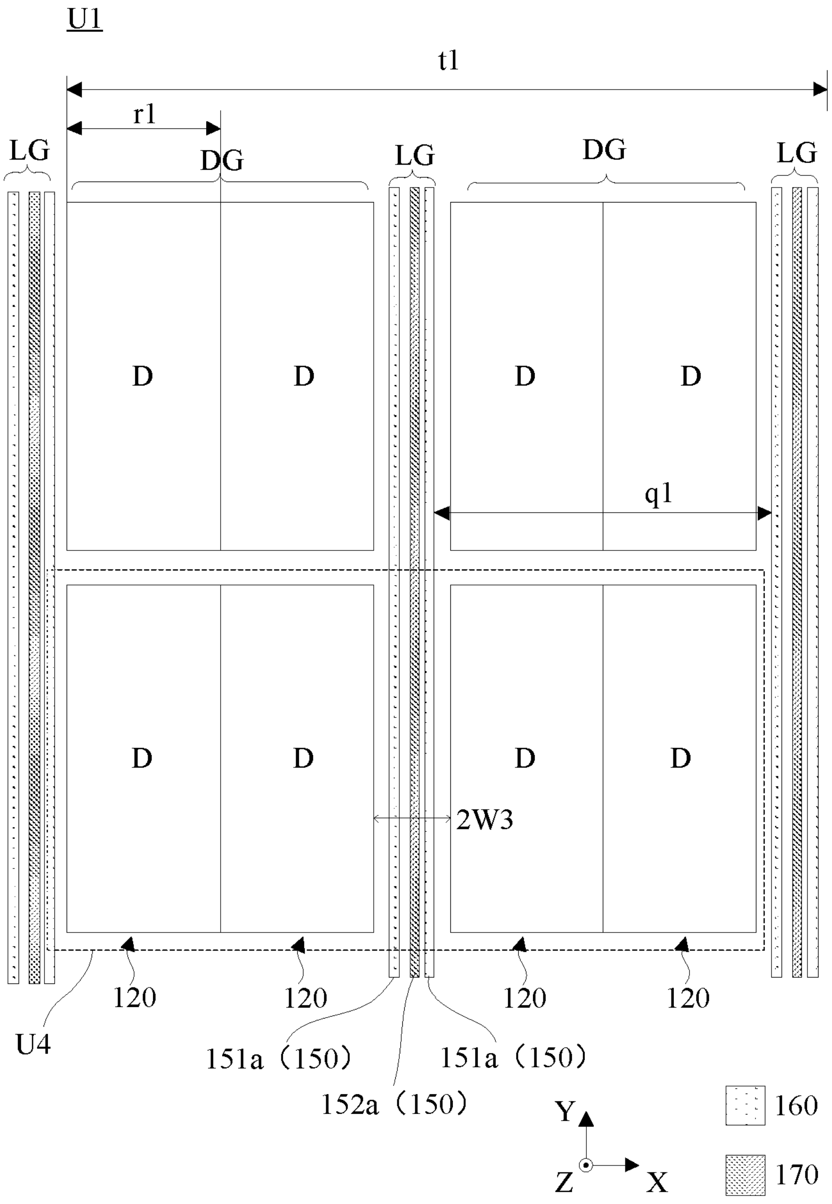
Figure 9:
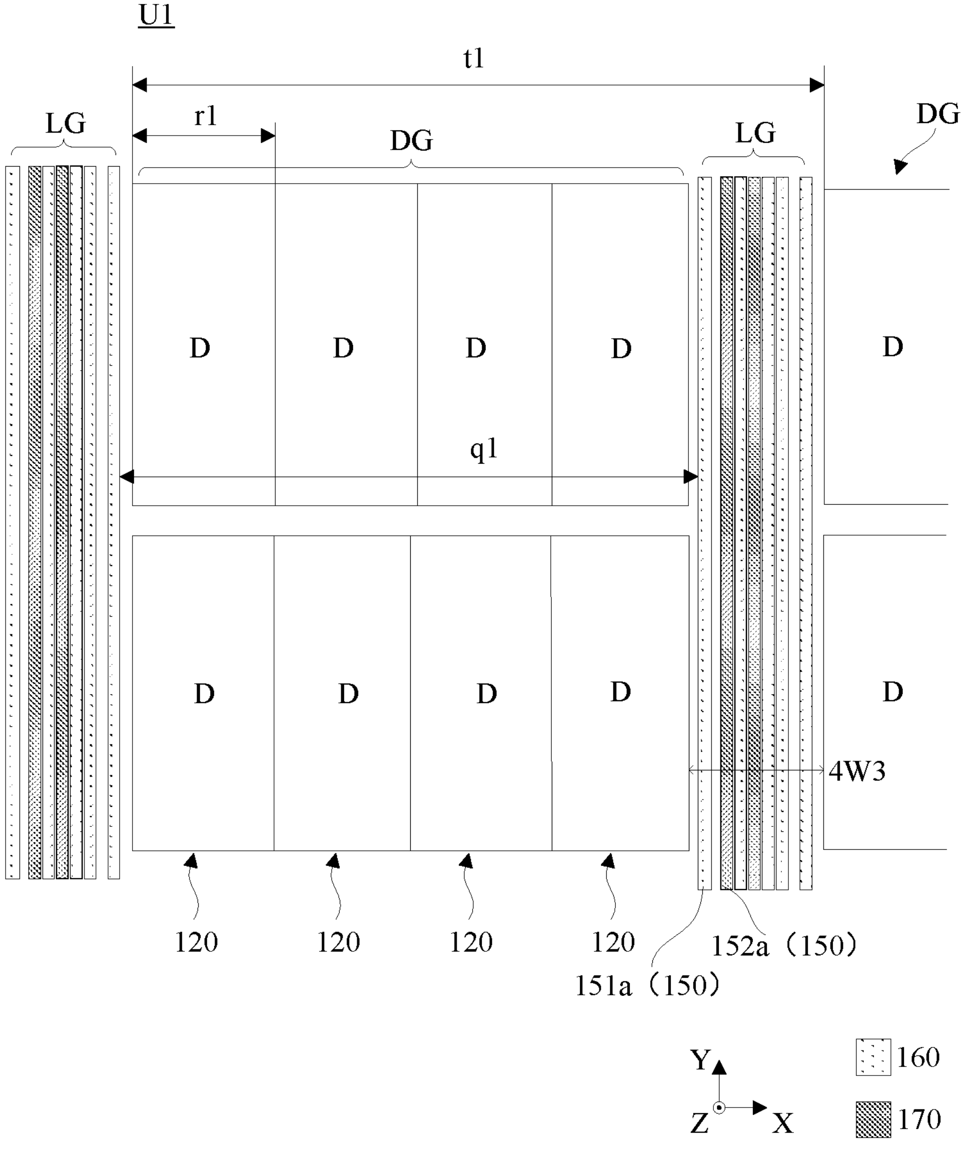

FIGS. 7 to 9 are partial enlarged views of a display panel, in accordance with some embodiments, and illustrate positions of data leads and pixel driving circuits. It will be noted that for brevity of the drawings, in FIGS. 7 to 9, the light-emitting devices are omitted, the specific structure of the pixel driving circuit is omitted, and only relative positions of the pixel driving circuits and the data leads are illustrated.

Referring to FIGS. 7 to 9, the plurality of circuit columns 120 in the display panel 10 constitute a plurality of circuit groups DG arranged in the first direction (e.g., parallel to the X-axis direction). A circuit group DG (e.g., each circuit group DG) includes at least one circuit column 120 (e.g., one or more circuit columns 120). Moreover, a data lead 150 is disposed between two adjacent circuit groups DG. That is, the data line 150 may be disposed between two adjacent pixel driving circuits D, and the two pixel driving circuits D belong to the two adjacent circuit groups DG, respectively. It will be noted that two circuit groups DG are adjacent to each other, which may mean that there is no other circuit group DG between the two circuit groups DG. Similarly, two pixel driving circuits D are adjacent to each other, which may mean that there is no other pixel driving circuit D between the two pixel driving circuits D.

The number of the data lead(s) 150 disposed between the two adjacent circuit groups DG is not limited in the embodiments of the present disclosure. For example, a single data lead 150 is disposed between the two adjacent circuit groups DG. For another example, data leads 150 are disposed between the two adjacent circuit groups DG.

Figure 10:
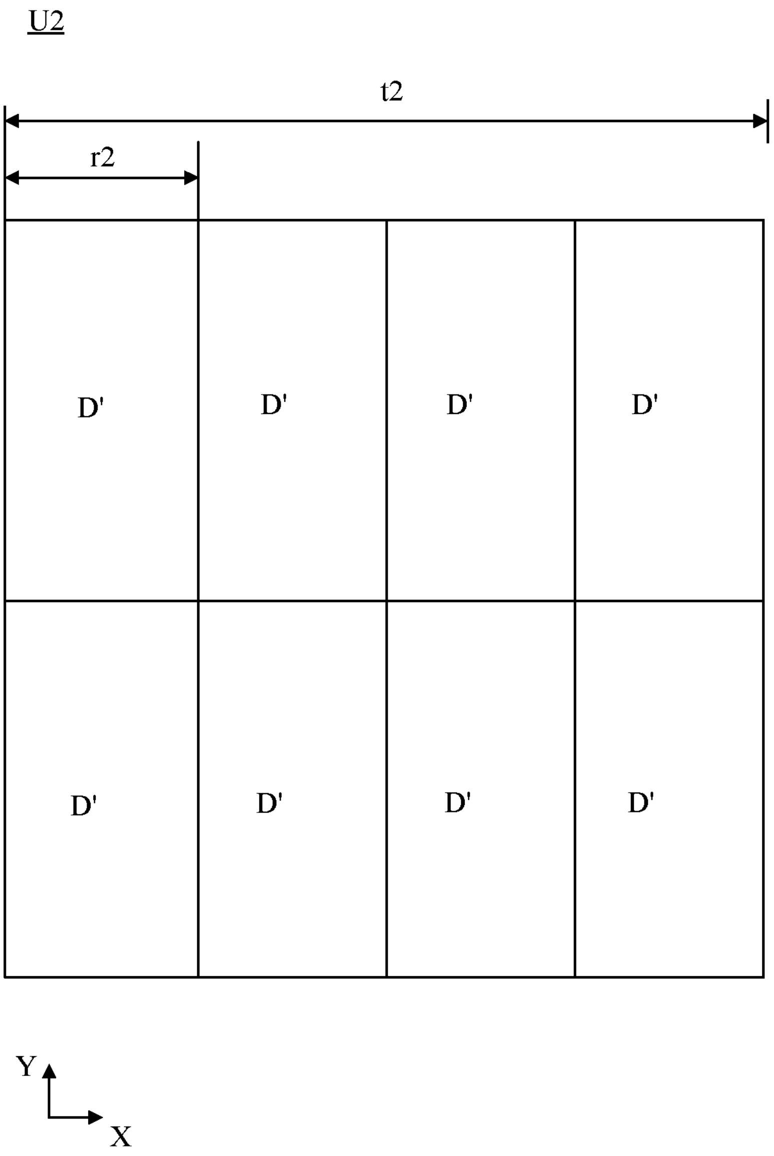
FIG. 10 is a partial enlarged view of the U2 area of the display panel in the related art in FIG. 1.

FIG. 10 is a partial enlarged view of the U2 area of the display panel in the related art shown in FIG. 1. It will be noted that FIGS. 7 to 9 each illustrate a structure of the display panel in the U1 area in FIG. 3 in accordance with some embodiments, and 8 pixel driving circuits are disposed in the U1 area. As a comparison, FIG. 10 illustrates a structure of the U2 area of the display panel in the related art, and 8 pixel driving circuits are disposed in the U2 area.

Referring to FIGS. 7 to 9, in the display panel provided in the embodiments of the disclosure, since the data lead 150 (e.g., each data lead 150) is disposed between the two adjacent circuit groups DG, on a premise that a dimension t1 of the U1 area in the first direction (e.g., parallel to the X-axis direction) and a dimension t2 of the U2 area in the first direction are the same, a dimension r1, in the first direction, of a pixel driving circuit D (e.g., each pixel driving circuit D) in the display panel in the embodiments of the disclosure may be less than a dimension r2 of a pixel driving circuit D' in the related art in the first direction. In this way, in the display panel provided in the embodiments of the present disclosure, on a premise that the size of the display panel is not increased and the number of the pixel driving circuits is not reduced, a certain space may be provided between two adjacent circuit groups DG by reducing the dimension of the pixel driving circuit D in the first direction, and this space may be used for providing one or more data leads 150. It will be understood that since two adjacent circuit groups DG have a certain space therebetween, one or more of the plurality of conductor pattern layers also have a certain space at a corresponding position, and the data lead(s) may be disposed in the corresponding space of the one or more conductor pattern layers. In this way, on the premise that the size of the display panel is not increased and the number of the pixel driving circuits is not reduced, at least one data lead 150 (e.g., one or more data leads 150) may be disposed in the display area AA.

Furthermore, referring to FIGS. 1 and 4, in the first direction, the first portion of the data lead 150 may be closer to a central line 10*c* of the display panel 10 than the first data line 141 coupled to this data lead 150. The central line 10*c* is a middle line of the display panel in the first direction (e.g., parallel to the X-axis direction). In this way, on a premise that the number of the data leads 150 in the display panel 10 is the same as the number of the data leads DL in the display panel DP, an inclined angle o1 of an inclined wiring (e.g., a portion of the second portion of the data lead 150 located in the fan-out area FA and having an extending direction non-parallel to the Y axis) in the fan-out area FA of the display panel 10, e.g., an included angle between the extending direction of the inclined wiring and the negative Y-axis direction, may be less than an inclined angle o2 of the inclined wiring in the fan-out area FA' of the display panel DP. In this way, a height h2 of the fan-out area FA of the display panel 10 may be less than the height h1 of the fan-out area FA' of the display panel DP, so that a size k2 of a bezel (i.e., a bezel provided with the fan-out area therein) of the display panel 10 is less than the size k1 of the bezel of the display panel DP. Based on the above, in the display panel provided in the embodiments of the disclosure, on the premise that the number of pixel driving circuits is not reduced, the at least one data lead 150 (e.g., the one or more data leads 150) may be disposed in the display area AA, so that the bezel size of the display panel may be reduced without increasing the size of the display panel and without reducing the resolution of the display panel.

Referring to FIGS. 7 to 9, in some embodiments, the at least one data lead 150 (e.g., the one or more data leads 150) includes at least one first data lead 151 (e.g., one or more first data leads 151). A portion 151*a* (i.e., a first portion of the first data lead 151) of a first data lead 151 (e.g., each first data lead 151) located in the display area AA is arranged in the same layer as the first data lines.

For example, in a case where the display panel includes a single data lead 150, and the data lead 150 includes a single first data lead 151, the data lead 150 is the first data lead 151. That is, the portion of the data lead 150 located in the display area AA is arranged in the same layer as the first data lines. For another example, in a case where the display panel includes a plurality of data leads 150, and the plurality of data leads 150 includes a single first data lead 151, one of the plurality of data leads 150 is the first data lead 151. That is, a portion of one of the plurality of data lines 150 located in the display area AA is arranged in the same layer as the first data lines. For yet another example, in a case where the display panel includes the plurality of data leads 150, and the plurality of data leads 150 include a plurality of first data leads 151, some (e.g., part or all) of the plurality of data leads 150 are the first data leads 151. That is, a portion of each of the part or all of the data leads 150 located in the display area AA is arranged in the same layer as the first data lines.

Referring to FIGS. 6 to 9, in some possible implementations, the portion 151*a* of the first data lead 151 located in the display area AA and the first data line 141 are located in the first conductor pattern layer 160.

Referring to FIGS. 6 to 9 again, the first data line 141 is located in the display area AA, and extend in the second direction with reference to the above description. Moreover, the portion 151*a* of the first data lead 151 located in the display area AA, i.e., the first portion 151*a* of the first data lead 151, may also extend in the second direction. That is, an extending direction of the first portion 151*a* of the first data lead 151 and an extending direction of the first data line 141 may be the same. Therefore, the portion 151*a* of the first data lead 151 located in the display area AA may be arranged in the same layer as the first data lines 141. In this way, compared with a case that one or more first data leads 151 are additionally disposed in other pattern layers (e.g., pattern layers in the display panel other than the conductor pattern layers for forming the plurality of pixel driving circuits and the conductor pattern layers including one or more signal lines), the display panel may include fewer pattern layers, so that the display panel may have a small thickness, which is conducive to the lightness and the thinness of the display panel and the display apparatus.

Referring to FIGS. 7 to 9, in some embodiments, the at least one data lead 150 (e.g., the one or more data leads 150) includes at least one second data lead 152 (e.g., one or more second data leads 152). A portion 152*a* (i.e., a first portion 152*a* of the second data lead 152) of a second data lead 152 (e.g., each second data lead 152) located in the display area AA is arranged in a different layer from the first data lines.

For example, in a case where the display panel includes a single data lead 150, and the data lead 150 includes a single second data lead 152, the data lead 150 is the second data lead 152. That is, the portion of the data lead 150 located in the display area AA is arranged in a different layer from the first data lines. For another example, in a case where the display panel includes the plurality of data leads 150, and the plurality of data leads 150 include a single second data lead 152, one of the plurality of data leads 150 is the second data lead 152. That is, a portion of one of the plurality of data leads 150 located in the display area AA is arranged in a different layer from the first data lines. For yet another example, in a case where the display panel includes the plurality of data leads 150, and the plurality of data leads 150 includes a plurality of second data leads 152, some (e.g., part or all) of the plurality of data leads 150 are the second data leads 152. That is, a portion of each of the part or all of the data leads 150 located in the display area AA is arranged in a different layer from the first data lines.

Since the portion 152*a* of the second data lead 152 located in the display area AA is arranged in the different layer from the first data lines, an influence of the second data lead 152 on the first data line 141 may be reduced, so that signal crosstalk between the second data lead 152 and the first data line 141 may be reduced.

Referring to FIGS. 6, 8 and 9, in some possible implementations, the first data line 141 is located in the first conductor pattern layer 160. The portion 152*a* of the second data lead 152 located in the display area AA is located in the second conductor pattern layer 170. In this way, compared with a case that one or more second data leads 152 are additionally disposed in other pattern layers (e.g., the pattern layers in the display panel other than the conductor pattern layers for forming the plurality of pixel driving circuits and the conductor pattern layers including one or more signal lines), the display panel may include fewer pattern layers, so that the display panel may have a small thickness, which is conducive to the lightness and the thinness of the display panel and the display apparatus.

Referring to FIGS. 8 and 9, in some embodiments, the display panel includes the plurality of data leads 150. The plurality of data leads 150 include at least one first data lead 151. A portion 151*a* of a first data lead 151 (e.g., each first data lead 151) located in the display area AA is arranged in the same layer as the first data lines. The plurality of data leads 150 further includes at least one second data lead 152. A portion 152*a* of a second data lead 152 (e.g., each second data lead 152) located in the display area AA is arranged in a different layer from the first data lines. The portion 151*a* of the first data lead 151 (e.g., each first data lead 151) located in the display area AA is arranged in a different layer from the portion 152*a* of the second data lead 152 located in the display area AA. In this way, on a premise that a distance between two adjacent circuit groups DG is constant, more data leads may be disposed in the corresponding spaces of the two conductor pattern layers.

Furthermore, in some possible implementations, a first data lead 151 (e.g., each first data lead 151) is non-overlapped with the second data lead 152 in a thickness direction (e.g., parallel to the Z-axis direction) of the display panel. In this way, signal crosstalk between the first data lead 151 and the second data lead 152 may be reduced, so that the display effect of the display panel may be improved. It will be understood that since the first data lead 151 (e.g., each first data lead 151) is non-overlapped with the second data lead 152, the portion 151*a* of the first data lead 151 located in the display area AA is non-overlapped with the portion 152*a* of the second data lead 152 located in the display area AA.

Figure 11:
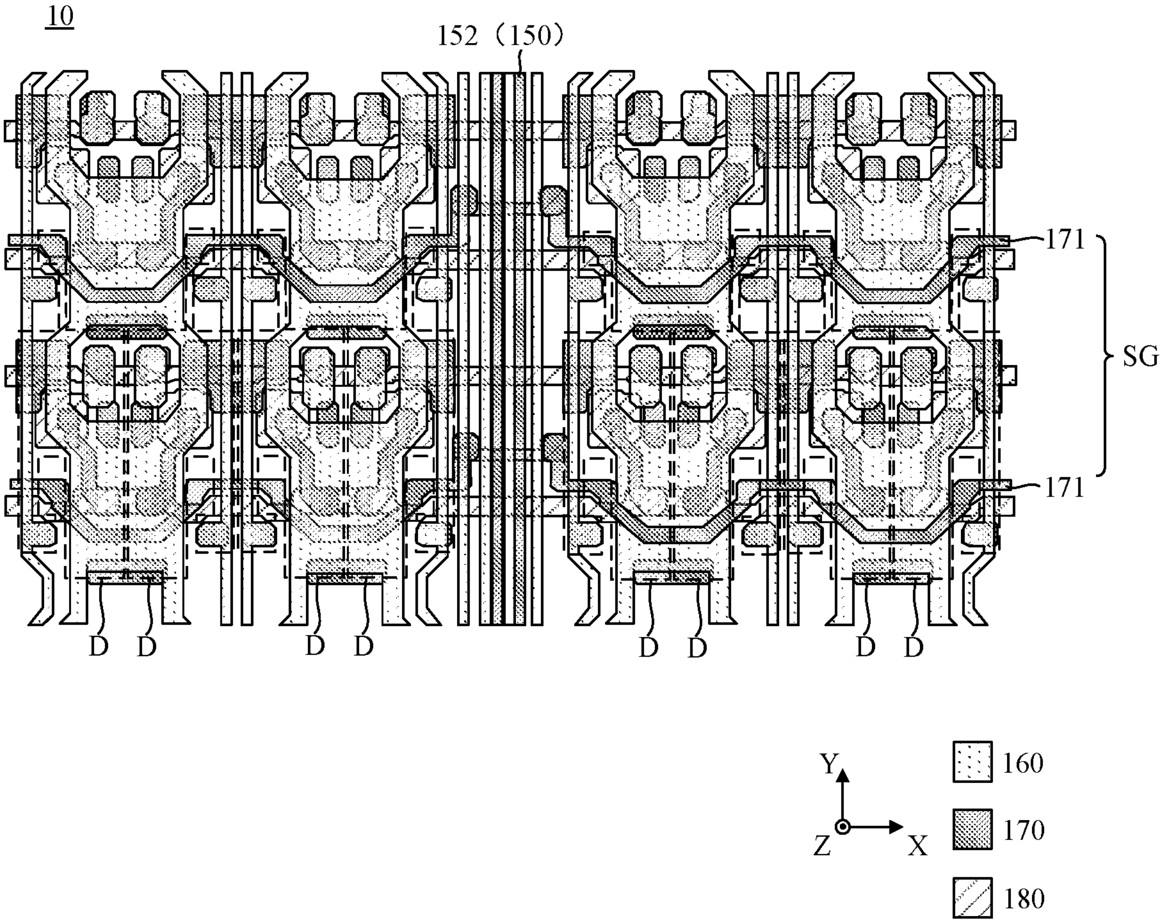
FIG. 11 is a top view of a display panel, in accordance with some embodiments.

FIG. 11 is a top view of a display panel in accordance with some embodiments, and illustrates pixel driving circuits and data leads in the display area. Referring to FIG. 11, in some embodiments, the display panel 10 includes the at least one data lead 150, and the at least one data lead 150 includes the at least one second data lead 152. The display panel 10 further includes a plurality of first signal lines 171. First signal lines 171 (e.g., all of the first signal lines 171) are disposed in the display area. For example, the first signal line 171 may be coupled to seventh transistors (i.e., T7 in FIG. 5) in pixel driving circuits D. The first signal line 171 may be configured to write respective second reset signals to the pixel driving circuits D. In this case, the first signal line 171 may also be referred to as a reset signal line. A first signal line 171 (e.g., each first signal line 171) extends in the first direction (e.g., parallel to the X-axis direction). For example, the first signal line 171 (e.g., each first signal line 171) extends in the first direction, and is coupled to pixel driving circuits D arranged in the first direction.

Figure 12:
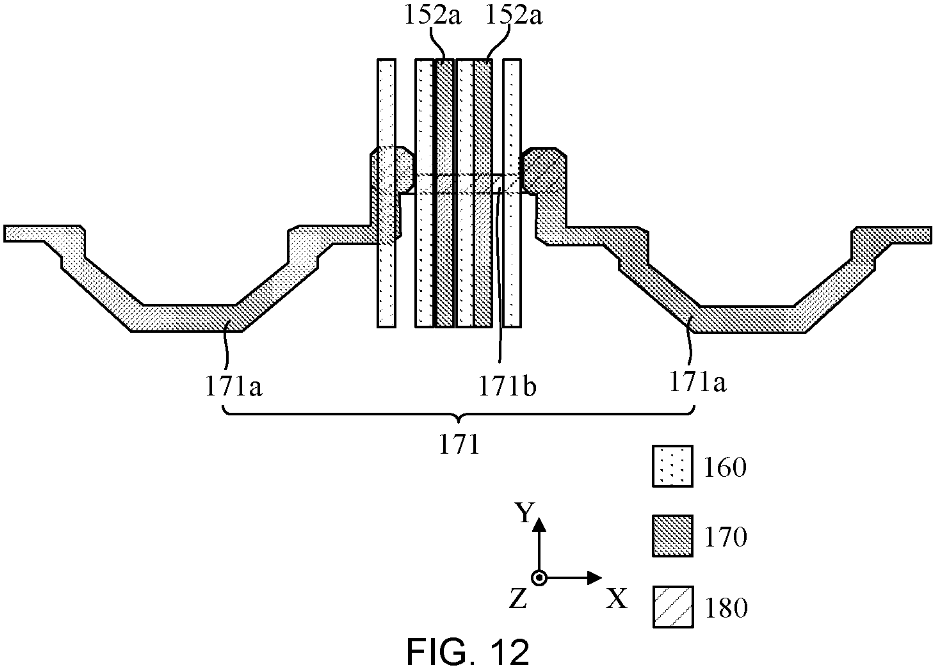
FIG. 12 is a partial enlarged view of the display panel in FIG. 11.

FIG. 12 is a partial enlarged view of the display panel in FIG. 11. It will be noted that for clarity of the drawing, FIG. 12 only illustrates the first signal line and the data leads, and other patterns are omitted.

Referring to FIG. 12, a first signal line 171 (e.g., each first signal line 171) includes a plurality of first line segments 171*a* and at least one second line segment 171*b* (e.g., one or more second line segments 171*b*). The portion 152*a* (i.e., the first portion of the second data lead) of the second data lead (e.g., each second data lead) located in the display area is arranged in the same layer as the first line segments 171*a*. For example, the portion 152*a* of the second data lead located in the display area and the first line segment 171*a* are located in the second conductor pattern layer 170. Moreover, the portion 152*a* of the second data lead (e.g., each second data lead) located in the display area is disposed between two adjacent first line segments 171*a*. It will be noted that two first line segments 171*a* are adjacent to each other, which may mean that there is no other first line segment 171*a* between the two first line segments 171*a*.

Referring to FIG. 12 again, furthermore, two adjacent first line segments 171*a* in the first direction (e.g., parallel to the X-axis direction) are coupled through a second line segment 171*b*, and the second line segment 171*b* is arranged in a different layer from the first line segments 171*a*. That is, the second line segment 171*b* is arranged in a different layer from the first portion 152*a* of one or more second data leads located between the two first line segments 171*a*. In this way, the first portion 152*a* of the second data lead extending in the second direction (e.g., parallel to the Y-axis direction) may be in non-contact with the first signal line 171 extending in the first direction, so that the portion 152*a* of the second data lead located in the display area and the first line segment 171*a* of the first signal line 171 may be arranged in the same layer without being short-circuited with each other.

Referring to FIGS. 11 and 12, in some possible implementations, the first line segment 171*a* (e.g., each first line segment 171*a*) and the first portion 152*a* of the second data lead (e.g., each second data lead) may be included in the second conductor pattern layer 170, and the second line segment 171*b* (e.g., each second line segment 171*b*) may be included in a third conductor pattern layer 180. It will be noted that the third conductor pattern layer 180 may be a conductor pattern layer. The third conductor pattern layer 180 may include a plurality of signal lines, and may further include one or more connection patterns. For example, the third conductor pattern layer 180 may include a plurality of signal lines extending in the first direction (e.g., parallel to the X-axis direction), and the signal line is configured to, for example, transmit a first scan signal (i.e., the first scan signal GA1 in FIG. 5) or a third scan signal (i.e., the third scan signal GA3 in FIG. 5). For example, the third conductor pattern layer 180, the second conductor pattern layer 170 and the first conductor pattern layer 160 may be arranged in sequence in the thickness direction (e.g., parallel to the Z-axis direction) of the display panel.

Referring to FIGS. 7 to 9, on a premise that a dimension of the display panel 10 in the first direction (e.g., parallel to the X axis direction) is constant, and the dimension r1 of the pixel driving circuit D in the first direction is constant, the plurality of pixel driving circuits D may have various arrangements in the display panel. In different arrangements, the number of the data lead(s) 150 between two adjacent circuit groups DG may be different. The arrangement of the plurality of pixel driving circuits D and the number of the corresponding data lead(s) 150 will be described in detail below.

Figure 13:
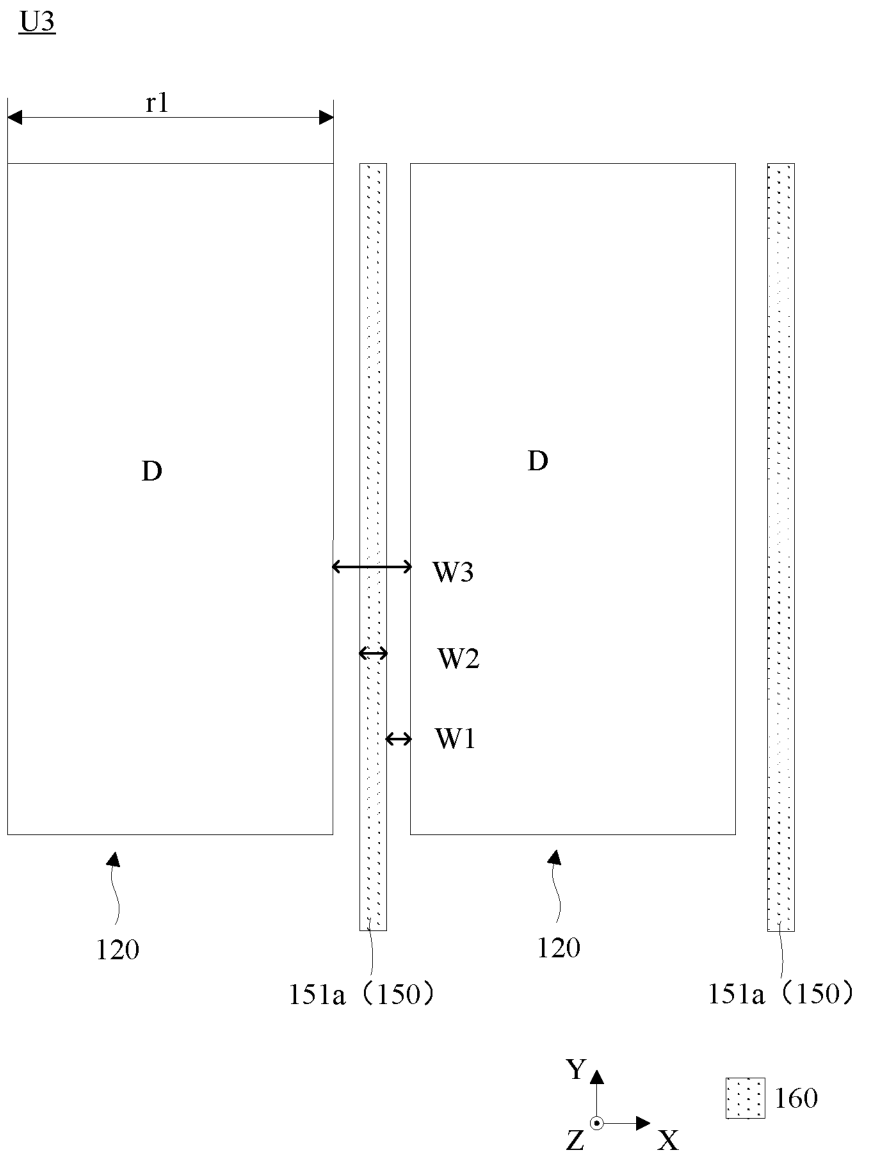
FIG. 13 is a partial enlarged view of the U3 area of the display panel in FIG. 7.
Figure 14:
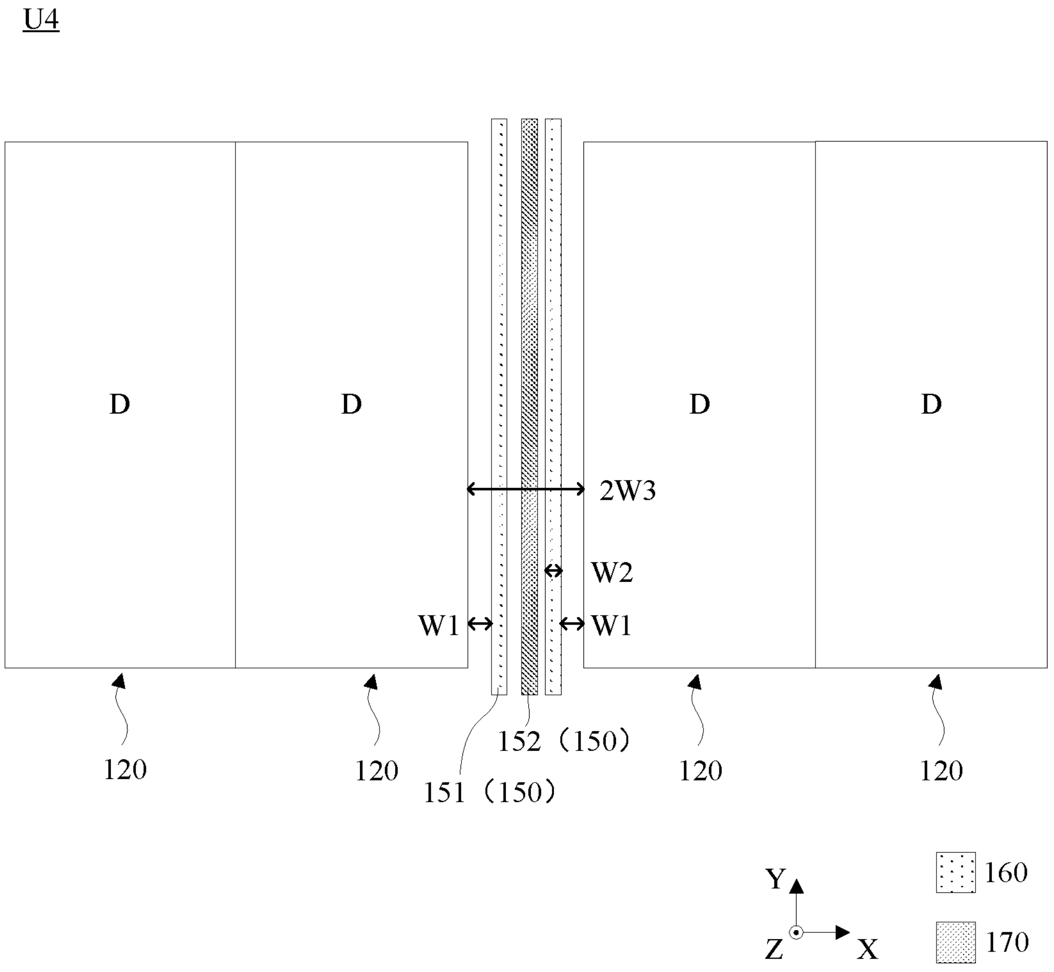
FIG. 14 is a partial enlarged view of the U4 area of the display panel in FIG. 8.

FIG. 13 is a partial enlarged view of the U3 area of the display panel in FIG. 7. FIG. 14 is a partial enlarged view of the U4 area of the display panel in FIG. 8.

First, it will be noted that in a manufacturing process of the display panel, e.g., in a manufacturing process of the data lead(s), a distance between two adjacent patterns arranged in the same layer needs to be considered. A minimum distance between two adjacent patterns arranged in the same layer should be greater than or equal to a critical value. A small distance between two adjacent patterns arranged in the same layer may cause signal crosstalk. Moreover, in the manufacturing process of the display panel, in consideration of the precision of the manufacturing process, two adjacent patterns arranged in the same layer is required to have a certain distance therebetween; otherwise, two adjacent patterns arranged in the same layer may be short-circuited due to process errors.

It will be noted that a plurality of patterns are "arranged in the same layer" herein, which means that the plurality of patterns belong to the same pattern layer, i.e., the plurality of patterns are formed by the same patterning process. The patterning process refers to a process capable of forming a plurality of patterns synchronously. For example, the patterning process may be an evaporation process or a printing process. For example, the patterning process may include following steps. A film is formed by using a film formation process, and then the film is patterned to form the pattern layer including the plurality of patterns. For example, a patterning process may include photoresist coating, exposure, development and etching processes. It will be noted that the plurality of patterns may be at least partially connected, or spaced apart from each other. In addition, the plurality of patterns may have different thicknesses (e.g., dimensions of the patterns in the thickness direction of the display panel).

Referring to FIG. 13, for the convenience of description, a minimum allowable distance between two adjacent patterns arranged in the same layer herein is denoted as W1. That is, the distance between two adjacent patterns arranged in the same layer should be greater than or equal to W1. It will be noted that two patterns are adjacent to each other, which may mean that there is no other pattern between the two patterns in the same pattern layer. A width of the first portion 151*a* of the first data lead 151 (e.g., a dimension of the first portion 151*a* of the first data lead 151 in a width direction of the first portion 151*a* of the first data lead 151, in which the width direction of the first portion 151*a* of the first data lead is perpendicular to the extending direction thereof, and is, for example, parallel to the X-axis direction) is denoted as W2. A width of the first portion 152*a* of the second data lead (e.g., a dimension of the first portion 152*a* of the second data lead in a width direction of the first portion 152*a* of the second data lead 152, in which the width direction of the first portion 152*a* of the second data lead 152 is perpendicular to the extending direction thereof, and is, for example, parallel to the X-axis direction) may be the same as the width of the first portion 151*a* of the first data lead. The width of first portion 152*a* of the second data lead may also be denoted as W2.

In some embodiments, referring to FIGS. 7 and 13, the circuit group DG (e.g., each circuit group DG) includes a single circuit column 120 with reference to the above description. Two adjacent circuit groups DG have a certain space therebetween. That is, two adjacent circuit columns 120 have the certain space therebetween. At least one data lead 150 (e.g., one or more data leads 150) may be disposed in this space. It will be noted that two circuit columns are adjacent to each other, which may mean that there is no other circuit column between the two circuit columns.

A minimum distance (referred to as a first distance below) between two adjacent circuit columns 120, which allows a single data lead to be arranged, is denoted as W3. In order to arrange the single data lead 150 between the two adjacent circuit columns 120, W3 is required to be equal to a sum of W2 and twice W1 (i.e., W3=W2+2W1). It will be noted that the minimum distance between two adjacent circuit columns 120 that allows the single data lead to be arranged may refer to a minimum distance between two patterns that respectively correspond to the two adjacent circuit columns 120 and are adjacent to the single data lead 150, in the conductor pattern layer including the at least one data lead 150 (e.g., the first conductor pattern layer including the one or more first data leads, or the second conductor pattern layer including the one or more second data leads). A pattern corresponds to a circuit column 120, which may mean that this pattern is a portion of one or more pixel driving circuits D in this circuit column 120. For example, this pattern is configured to couple a plurality of elements in a pixel driving circuit D in the circuit column. Alternatively, the pattern corresponds to the circuit column 120, which may mean that this pattern is coupled to one or more pixel driving circuits D in this circuit column 120. For example, this pattern is configured to write respective electrical signal(s) to the one or more pixel driving circuits D in this circuit column 120. For example, this pattern is a signal line, such as a first data line or a power supply voltage signal line. For another example, this pattern is configured to couple the one or more pixel driving circuits D in this circuit column 120 to other element(s). For example, this pattern is configured to couple the one pixel driving circuit D to the light-emitting device E.

In some other embodiments, referring to FIGS. 8, 9 and 14, the circuit group DG (e.g., each circuit group DG) includes a plurality of circuit columns 120. For example, referring to FIGS. 8 and 14, the circuit group DG includes two circuit columns 120. For another example, referring to FIG. 9, the circuit group DG includes four circuit columns 120.

Comparing FIGS. 8 and 14 with FIGS. 7 and 13, on the premise that the dimension of the display panel in the first direction is constant, and the dimension r1 of the pixel driving circuit D in the first direction is constant, in a case where the circuit group DG includes two circuit columns 120, a distance (referred to as a second distance below) between two adjacent circuit groups DG is twice W3 (i.e., 2W3), and the second distance allows M1 (M1 is greater than or equal to 2, i.e., M1≥2) data leads to be arranged. Of course, the number actually arranged is N1, and N1 is less than or equal to M1 (i.e., N1≤M1). The second distance may refer to a distance between two patterns that respectively correspond to the two adjacent circuit columns 120 and are adjacent to the N1 data leads 150, in the conductor pattern layer including the plurality of data leads 150 (e.g., the first conductor pattern layer including the plurality of first data leads arranged in the same layer, or the second conductor pattern layer including the plurality of second data leads arranged in the same layer). The two adjacent circuit columns 120 refer to two circuit columns 120 that respectively belong to the two adjacent circuit groups DG and are close to each other.

With reference to the above description, since a data lead may be arranged in a space with a size of W3, two data leads arranged in the same layer may be disposed in a space with a size of 2W3. For example, two first data leads 151 may be disposed in a corresponding space of the first conductor pattern layer 160. Since W3 is equal to the sum of W2 and twice W1 (i.e., W3=W2+2W1), after the two data leads arranged in the same layer are disposed in the space with the size of 2W3, the remaining space may have a size of W1 (i.e., 2W3−(2W2+3W1)=2(W2+2W1)−(2W2+3W1)=W1). One or more data leads may be disposed in the space with the size of W1. For example, more first data leads may be disposed in the corresponding space of the first conductor pattern layer. For another example, one or more second data leads may be disposed in a corresponding space of the second conductor pattern layer. Based on the above, that is, for an area corresponding to 4 circuit columns, in the case where the circuit group DG includes two circuit columns 120, more than 4 data leads may be disposed in this area.

Similarly, comparing FIG. 9 with FIGS. 7 and 13, on the premise that the dimension of the display panel in the first direction is constant, and the dimension r1 of the pixel driving circuit D in the first direction is constant, in a case where the circuit group DG includes four circuit columns 120, a distance (referred to as a third distance below) between two adjacent circuit groups DG is 4 times W3 (i.e., 4W3), and the third distance allows M2 (M2 is greater than or equal to 4, i.e., M2≥4) data leads to be arranged. Of course, the number actually arranged is N2, and N2 is less than or equal to M2 (i.e., N2≤M2). The third distance may be similar to the above second distance with reference to the above description, and will not be repeated here. Based on the above, 5 data leads arranged in the same layer may be disposed in a space with a size of 4W3. Since W3 is equal to the sum of W2 and twice W1 (i.e., W3=W2+2W1), after 5 data leads arranged in the same layer are disposed in the space with the size of 4W3, the remaining space may have a size of a difference between twice W1 and W2 (i.e., 4W3−(5W2+6W1)=4(W2+2W1)−(5W2+6W1)=2W1−W2). One or more data leads may be disposed in the space with the size of 2W1−W2. For example, more first data leads may be disposed in the corresponding space of the first conductor pattern layer. For another example, one or more second data leads may be disposed in the corresponding space of the second conductor pattern layer. That is, for an area corresponding to 4 circuit columns, in the case where the circuit group DG includes 4 circuit columns 120, more than 5 (e.g., 6 or 7) data leads 150 may be disposed in this area.

It will be understood that in a case where the circuit group DG includes more (e.g., greater than or equal to 5) circuit columns 120, on the premise that the dimension of the display panel in the first direction is constant, and the dimension of the pixel driving circuit in the first direction is constant, more data leads may be disposed between two adjacent circuit groups DG, i.e., more data leads may be disposed in the display panel.

Referring to FIG. 4, in some embodiments, lengths q1' of the respective portions of the data leads 150 located in the display area AA are increased and then decreased in the first direction (e.g., parallel to the X-axis direction). The portion of the data lead 150 (e.g., each data lead 150) located in the display area AA, i.e., the first portion of the data lead 150, has a length of q1' that may be a dimension of the first portion in the second direction (e.g., parallel to the Y-axis direction). In this way, the plurality of data leads 150 are uniformly distributed, so that the structural stability of the display panel may be improved.

Referring to FIGS. 3 and 7 to 9, in some embodiments, the display panel includes the plurality of light-emitting devices E, and a light-emitting device E is coupled to a pixel driving circuit D. First data lines 141 include a plurality of heterochromatic data lines. That is, the first data lines 141 in the plurality of the first data lines 141 are the heterochromatic data lines. A heterochromatic data line (e.g., each heterochromatic data line) extends in the second direction (e.g., parallel to the Y-axis direction), and is coupled to at least two pixel driving circuits D in a circuit column 120. Moreover, a heterochromatic data line (e.g., each heterochromatic data line) is coupled to at least two light-emitting devices E with different light-emitting colors. The data leads 150 respectively coupled to the heterochromatic data lines (e.g., all of the heterochromatic data lines) are all arranged in the same layer. For example, the data leads 150 respectively coupled to the heterochromatic data lines (e.g., all of the heterochromatic data lines) are all first data leads 151, and are all included in the first conductor pattern layer 160.

On a premise that the same electrical signal is written to two data leads, in a case where the two data leads are arranged in the same layer, a difference in electrical loads on the two data leads (caused by, for example, parasitic capacitances in the pixel driving circuits) may be small, so that a difference in electrical signals output from the two data leads to the pixel driving circuits D may be small. Based on this, in a case where the data leads (e.g., all of the data leads) are arranged in the same layer, the display effect of the display panel may be improved. Furthermore, since the heterochromatic data line is coupled to the at least two light-emitting devices E with different light-emitting colors, an electrical signal transmitted on the heterochromatic data line may have a large variation frequency. Based on this, since the data leads 150 respectively coupled to the heterochromatic data lines (e.g., all of the heterochromatic data lines) are all arranged in the same layer, the display effect of the display panel may be further improved.

Referring to FIG. 4, in some embodiments, the display panel further includes at least one second data line 142 (e.g., one or more second data lines 142) adjacent to the central line 10*c* of the display panel. A second data line 142 (e.g., each second data line 142) extends from the display area AA to the non-display area SA in the second direction (e.g., parallel to the Y-axis direction), and is coupled to at least one pad P (e.g., one or more pads P). For example, the second data line 142 extends from the display area AA to the bonding area PA through the fan-out area FA and the folding area BA in the second direction, and is coupled to the at least one pad P located in the bonding area PA. The second data line 142 may be coupled to the at least one pad P without a connection line and a data lead. Thus, since the display panel includes the at least one second data line 142, the structure of the display panel may be simple, so that the yield of the display panel may be improved.

Referring to FIGS. 7 to 9, in some embodiments, the display panel includes the plurality of data leads 150. The plurality of data leads 150 constitute a plurality of lead groups LG arranged in the first direction (e.g., parallel to the X-axis direction). Each data lead 150 in a lead group LG (e.g., each lead group LG) is disposed between two adjacent circuit groups DG. That is, two adjacent circuit groups DG are provided with a lead group LG therebetween. In the display area, a distance q1 between every two adjacent lead groups LG in the plurality of lead groups LG is substantially the same. It will be noted that two lead groups LG are adjacent to each other, which may mean that there is no other lead group LG between the two lead groups LG. For example, the distance q1 between two adjacent lead groups LG in the display area may be a minimum distance, in the first direction, between two data leads 150 that respectively belong to the two lead groups LG and are close to each other. Since the distance q1 between every two adjacent lead groups LG in the display area is substantially the same, the number of the circuit column(s) 120 in each circuit group DG in the display panel may be the same.

Since the distance q1 between every two adjacent lead groups LG in the plurality of lead groups LG is substantially the same, the display panel may have a uniform structure. For example, a dimension of each of the plurality of circuit groups DG in the first direction (e.g., parallel to the X-axis direction) may be substantially the same, so that the display panel may have the uniform structure, and the structural stability of the display panel may be improved.

Figure 15:
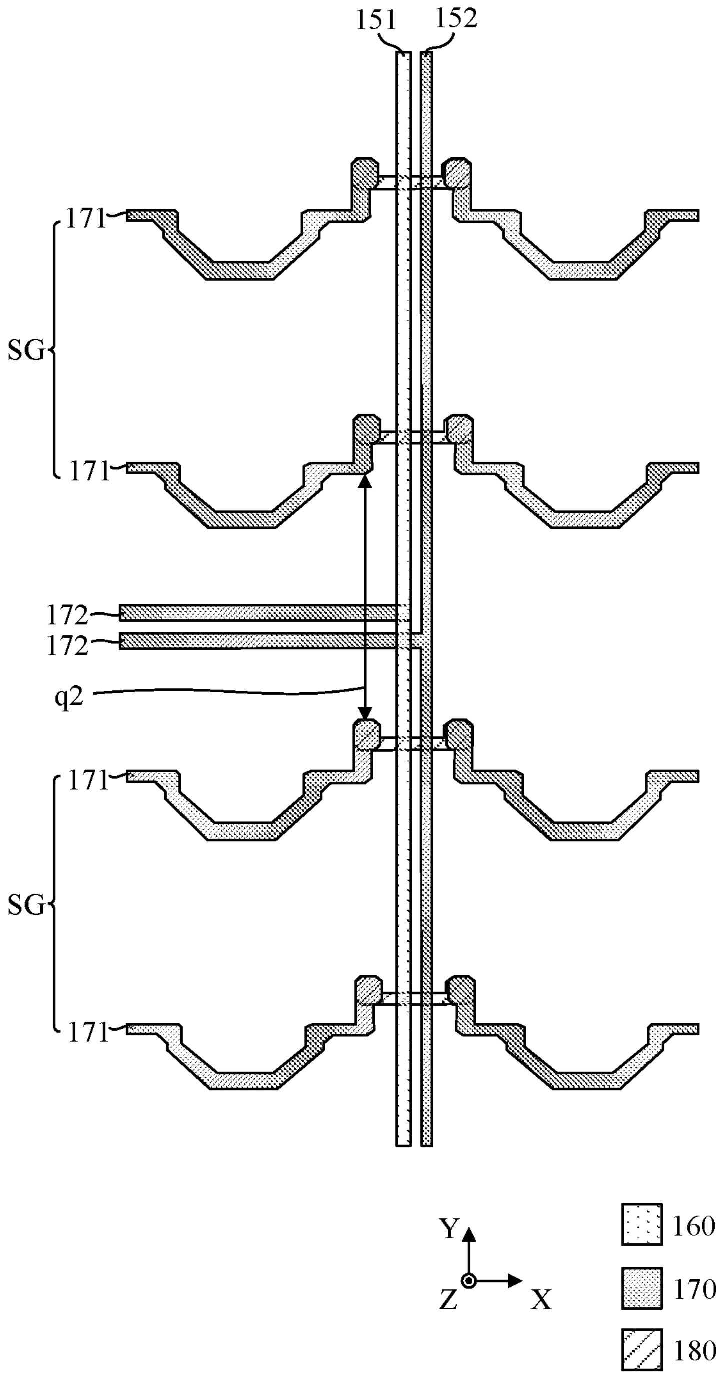
FIG. 15 is a partial enlarged view of a display area of a display panel, in accordance with some embodiments.

FIG. 15 is a partial enlarged view of a display area of a display panel in accordance with some embodiments, and illustrates relative positions of connection lines, data leads and first signal lines. It will be noted that for brevity of the drawing, FIG. 15 only illustrates the connection lines, the data leads, and the first signal lines, and other structures are omitted.

Referring to FIGS. 4 and 15, in some embodiments, the display panel further includes at least one connection line 172 (e.g., one or more connection lines 172). A connection line 172 (e.g., each connection line 172) is disposed in the display area AA. A connection line 172 (e.g., each connection line 172) extends in the first direction (e.g., parallel to the X-axis direction). The first data line 141 is coupled to the data lead 150 through the connection line 172. For example, the connection line 172 may be coupled to the first data line 141, and may further be coupled to the first data lead 151 or the second data lead 152, so that the first data lead 141 may be coupled to the first data lead 151 or the second data lead 152 through the connection line 172.

Referring to FIGS. 4 and 15, in some embodiments, the display panel further includes at least one connection line 172, and further includes a plurality of signal lines disposed in the display area AA. A signal line (e.g., each signal line) extends in the first direction (e.g., parallel to the X-axis direction). For example, a signal line (e.g., each signal line) is a first signal line 171. Of course, the signal line may be other type of signal line, which is not limited in this embodiments of the present disclosure, as long as the signal line is disposed in the display area AA and extends in the first direction. A description will be made below in an example where the signal line is the first signal line.

Furthermore, the plurality of signal lines (e.g., the plurality of first signal lines 171) constitute a plurality of signal line groups SG arranged in the second direction (e.g., parallel to the Y-axis direction). A signal line group SG includes at least one signal line (e.g., one or more signal lines). A connection line 172 (e.g., each connection line 172) is arranged in the same layer as at least a portion (e.g., a portion or all) of the signal line, and is disposed between two adjacent signal line groups SG. It will be noted that two signal line groups SG are adjacent to each other, which may mean that there is no other signal line group SG between the two signal line groups SG. For example, in a case where the signal line is the first signal line 171, the connection line 172 is arranged in the same layer as the first line segment 171*a* of the first signal line. For example, the connection line 172 and the first line segment 171*a* of the first signal line are included in the second conductor pattern layer 170.

The connection line 172 extends in the first direction, and the signal lines also extends in the first direction. Based on this, the connection line 172 may be arranged in the same layer as the at least a portion of the signal line, and is disposed between two adjacent signal line groups SG. In this way, compared with a case that one or more connection lines 172 are additionally disposed in other pattern layers (e.g., the pattern layers in the display panel other than the conductor pattern layers for forming the plurality of pixel driving circuits and the conductor pattern layers including one or more signal lines), the display panel may include fewer pattern layers, so that the display panel may have a small thickness, which is conducive to the lightness and the thinness of the display panel and the display apparatus. In addition, similarly to the data lead, a space may be provided between two adjacent signal line groups SG by reducing a dimension of at least a portion (e.g., a portion or all) of the pixel driving circuit in the second direction (e.g., parallel to the Y-axis direction), and this space may be used for providing one or more connection lines 172. In this way, on the premise that the size of the display panel is not increased and the number of the pixel driving circuits D is not reduced, a plurality of connection lines 172 may be disposed in the display area AA.

Referring to FIG. 15 again, in some embodiments, the signal line group SG (e.g., each signal line group SG) includes a plurality of signal lines, e.g., two signal lines. Alternatively, in some other embodiments, the signal line group SG (e.g., each signal line group SG) includes a single signal line. Similarly to the data lead, in a case where the signal line group SG (e.g., each signal line group SG) includes the plurality of signal lines, more connection lines may be disposed in the display panel.

Referring to FIG. 15 again, in some embodiments, a distance q2 between every two adjacent signal line groups SG in the plurality of signal line groups SG is substantially the same. For example, the distance q2 between two adjacent signal line groups SG may be a minimum distance, in the second direction, between two signal lines that respectively belong to the two signal line groups SG and are adjacent to each other. Since the distance q2 between every two adjacent signal line groups SG in the plurality of signal line groups SG is substantially the same, the display panel may have a uniform structure, and the structural stability of the display panel may be improved.

Some embodiments of the present disclosure further provide the manufacturing method of the display panel. The display panel in any one of the above embodiments may be manufactured by using the manufacturing method. The manufacturing method of the display panel includes: forming a plurality of pixel driving circuits, a plurality of pads, a plurality of first data lines and at least one data lead on a substrate.

The plurality of pixel driving circuits constitute a plurality of circuit columns arranged in a first direction, and the circuit column includes at least two pixel driving circuits arranged in a second direction. The first direction and the second direction intersect. The plurality of pads are located on a side of the plurality of pixel driving circuits in the second direction. The first data line extends in the second direction, and is coupled to the at least two pixel driving circuits in the circuit column. The data lead extends in the second direction, and is coupled to the first data line and at least one pad. The plurality of circuit columns constitute a plurality of circuit groups arranged in the first direction, and the circuit group includes at least one circuit column. The data lead is disposed between two adjacent circuit groups. A detailed description of the foregoing structures may refer to the above description, and will not be repeated here.

The foregoing descriptions are merely specific implementations of the present disclosure. However, the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A display panel having a display area and a non-display area located on at least one side of the display area, the display panel comprising:
- a plurality of pixel driving circuits disposed in the display area and constituting a plurality of circuit columns arranged in a first direction; wherein a circuit column includes at least two pixel driving circuits arranged in a second direction, and the second direction and the first direction intersect;
- a plurality of pads disposed in the non-display area and located on a side of the display area in the second direction;
- a plurality of first data lines disposed in the display area, wherein a first data line extends in the second direction, and is coupled to the at least two pixel driving circuits in the circuit column;
- at least one data lead; wherein a data lead in the at least one data lead is coupled to the first data line, and extends from the display area to the non-display area; the data lead is coupled to at least one pad in the plurality of pads; and
- a plurality of first signal lines disposed in the display area; wherein a first signal line extends in the first direction, and includes a plurality of first line segments and at least one second line segment;
- wherein the plurality of circuit columns constitute a plurality of circuit groups arranged in the first direction, and a circuit group includes at least one circuit column; the data lead is disposed between two adjacent circuit groups;
- wherein the at least one data lead includes at least one second data lead, and a portion of a second data lead in the at least one second data lead located in the display area is arranged in a different layer from the first data line;
- wherein the portion of the second data lead located in the display area is arranged in a same layer as the first line segments, and is disposed between two adjacent first line segments; and
- two adjacent first line segments in the first direction are coupled through a second line segment in the at least one second line segment, and the second line segment is arranged in a different layer from the first line segments.

2. The display panel according to claim 1, wherein
- the at least one data lead includes at least one first data lead, and a portion of a first data lead in the at least one first data lead located in the display area is arranged in a same layer as the first data line.

3. The display panel according to claim 1, wherein
- the at least one data lead further includes at least one first data lead; and a portion of a first data lead in the at least one first data lead located in the display area is arranged in a same layer as the first data line; and
- the first data lead is non-overlapped with the second data lead in a thickness direction of the display panel.

4. The display panel according to claim 1, further comprising:
- at least one connection line disposed in the display area and extending in the first direction; wherein
- the first data line is coupled to the data lead through a connection line in the at least one connection line, and the connection line is arranged in the same layer as the portion of the second data lead located in the display area.

5. The display panel according to claim 1, further comprising:
- at least one connection line disposed in the display area and extending in the first direction; wherein
- the first data line is coupled to the data lead through a connection line in the at least one connection line.

6. The display panel according to claim 5, further comprising:
- a plurality of signal lines disposed in the display area and extending in the first direction; wherein
- the plurality of signal lines constitute a plurality of signal line groups arranged in the second direction, and a signal line group includes at least one signal line; and
- the connection line is arranged in a same layer as at least a portion of a signal line, and is disposed between two adjacent signal line groups.

7. The display panel according to claim 6, wherein
- a distance between every two adjacent signal line groups in the plurality of signal line groups is substantially same.

8. The display panel according to claim 1, further comprising:
- a plurality of light-emitting devices respectively coupled to the pixel driving circuits; wherein
- the plurality of first data lines include a plurality of heterochromatic data lines, and a heterochromatic data line is coupled to at least two light-emitting devices with different light-emitting colors; and
- a portion, located in the display area, of each of data leads respectively coupled to the plurality of heterochromatic data lines is arranged in a same layer.

9. The display panel according to claim 1, further comprising:
- at least one second data line adjacent to a central line of the display panel; a second data line in the at least one second data line extends from the display area to the non-display area in the second direction, and is coupled to at least one pad in the plurality of pads.

10. The display panel according to claim 1, wherein
- the at least one data lead includes a plurality of data leads constituting a plurality of lead groups arranged in the first direction; each data lead in a lead group is disposed between two adjacent circuit groups; and
- in the display area, a distance between every two adjacent lead groups in the plurality of lead groups is substantially same.

11. A display apparatus, comprising the display panel according to claim 1.

12. The display panel according to claim 1, wherein in the first direction, a portion of the data lead located in the display area is closer to a central line of the display panel than the first data line.

13. The display panel according to claim 1, wherein the at least one data lead includes a plurality of data leads each having a first portion located in the display area; the first portion has a length in the second direction, and lengths of first portions of the plurality of data leads are increased and then decreased in the first direction.

14. The display panel according to claim 10, wherein a number of the at least one circuit column in each circuit group is same.

15. The display panel according to claim 1, wherein the at least one circuit column includes one, two or four circuit columns.

16. The display panel according to claim 8, wherein the heterochromatic data line is further coupled to the at least two pixel driving circuits in the circuit column.

* * * * *